US012633196B2

(12) United States Patent
Acres

(10) Patent No.: US 12,633,196 B2
(45) Date of Patent: May 19, 2026

(54) BONUS WITH PROXIMITY OF OCCURRENCE RELATED TO BASE GAME OUTCOMES OR PAYBACK PERCENTAGE

(71) Applicant: Acres Technology, Las Vegas, NV (US)

(72) Inventor: John F. Acres, Las Vegas, NV (US)

(73) Assignee: Acres Technology, Las Vegas, NV (US)

(*) Notice: Subject to any disclaimer, the term of this patent is extended or adjusted under 35 U.S.C. 154(b) by 0 days.

(21) Appl. No.: 18/528,073

(22) Filed: Dec. 4, 2023

(65) Prior Publication Data

US 2024/0112536 A1 Apr. 4, 2024

Related U.S. Application Data

(60) Continuation of application No. 16/866,975, filed on May 5, 2020, now Pat. No. 11,869,305, which is a continuation of application No. 16/247,859, filed on Jan. 15, 2019, now Pat. No. 10,657,767, which is a continuation of application No. 16/022,261, filed on Jun. 28, 2018, now Pat. No. 10,217,321, which is a continuation of application No. 14/954,233, filed on Nov. 30, 2015, now Pat. No. 10,037,657, which is a division of application No. 13/603,793, filed on Sep.

(Continued)

(51) Int. Cl.

| | |
|---|---|
| ***G07F 17/00*** | (2006.01) |
| ***G07F 17/32*** | (2006.01) |

(52) U.S. Cl.

CPC .......... *G07F 17/3244* (2013.01); *G07F 17/32* (2013.01); *G07F 17/323* (2013.01); *G07F 17/3258* (2013.01); *G07F 17/3267* (2013.01); *G07F 17/3286* (2013.01)

(58) Field of Classification Search

None

See application file for complete search history.

(56) References Cited

U.S. PATENT DOCUMENTS

| | | | |
|---|---|---|---|
| 4,926,255 | A | 5/1990 | Von Kohorn |
| 5,227,874 | A | 7/1993 | Von Kohorn |

(Continued)

FOREIGN PATENT DOCUMENTS

| | | | |
|---|---|---|---|
| AU | 2003200434 | A1 | 8/2003 |
| CN | 1799667 | A | 7/2006 |

(Continued)

OTHER PUBLICATIONS

U.S. Appl. No. 16/866,975 (2020/0265675), filed May 5, 2020 (Aug. 20, 2020), John F. Acres (Acres Technology).

(Continued)

*Primary Examiner* — Paul A D'Agostino

(74) *Attorney, Agent, or Firm* — Ballard Spahr LLP

(57) ABSTRACT

Each play of a base game increases the likelihood of winning a bonus award. A display provides a graphical indication of the change in likelihood of winning the bonus award. In one aspect, the bonus award comprises the opportunity to play a secondary game. In another aspect, winning the bonus award may be based on payback percentage or outcomes of the base game. In yet another aspect, the timing of the next bonus award can be configured, or otherwise based on one or more conditions.

20 Claims, 31 Drawing Sheets

Related U.S. Application Data 5, 2012, now Pat. No. 9,208,637, which is a division of application No. 12/405,824, filed on Mar. 17, 2009, now Pat. No. 8,272,941.

(60) Provisional application No. 61/038,314, filed on Mar. 20, 2008.

(56) References Cited

U.S. PATENT DOCUMENTS

| | | | | |
|---|---|---|---|---|
| 5,280,909 | A | 1/1994 | Tracy | |
| 5,292,127 | A | 3/1994 | Kelly et al. | |
| 5,297,802 | A | 3/1994 | Pocock et al. | |
| 5,486,005 | A * | 1/1996 | Neal | A63F 1/18 273/274 |
| 5,551,692 | A * | 9/1996 | Pettit | G07F 17/3248 463/16 |
| 5,643,083 | A | 7/1997 | Hasegawa | |
| 5,743,523 | A | 4/1998 | Kelly et al. | |
| 5,743,798 | A * | 4/1998 | Adams | G07F 17/3262 273/142 E |
| 5,788,573 | A * | 8/1998 | Baerlocher | G07F 17/3258 463/16 |
| 5,823,874 | A | 10/1998 | Adams | |
| 5,882,261 | A * | 3/1999 | Adams | G07F 17/32 463/20 |
| 5,902,983 | A * | 5/1999 | Crevelt | G07F 17/32 463/20 |
| 5,941,773 | A | 8/1999 | Harlick | |
| 5,980,384 | A | 11/1999 | Barrie | |
| 6,012,982 | A | 1/2000 | Piechowiak et al. | |
| 6,110,043 | A | 8/2000 | Olsen | |
| 6,213,874 | B1 * | 4/2001 | Heflin | G07F 17/3255 273/118 A |
| 6,224,482 | B1 | 5/2001 | Bennett | |
| 6,270,409 | B1 * | 8/2001 | Shuster | G07F 17/3244 463/20 |
| 6,315,666 | B1 * | 11/2001 | Mastera | G07F 17/3211 463/31 |
| 6,331,148 | B1 * | 12/2001 | Krause | A63F 1/00 463/16 |
| 6,446,964 | B1 | 9/2002 | Kelly et al. | |
| 6,491,296 | B2 | 12/2002 | Kelly et al. | |
| 6,518,967 | B1 * | 2/2003 | Iwasaki | G06T 17/00 345/426 |
| 6,575,832 | B1 | 6/2003 | Manfredi et al. | |
| 6,605,000 | B2 | 8/2003 | Adams | |
| 6,645,068 | B1 | 11/2003 | Kelly et al. | |
| 6,769,986 | B2 | 8/2004 | Vancura | |
| 6,827,646 | B2 | 12/2004 | Adams | |
| 6,851,674 | B2 | 2/2005 | Pierce et al. | |
| 6,932,702 | B1 | 8/2005 | Harris | |
| RE38,812 | E | 10/2005 | Acres et al. | |
| 6,984,173 | B1 | 1/2006 | Piechowiak et al. | |
| 7,069,184 | B1 | 6/2006 | Barger et al. | |
| 7,070,501 | B2 * | 7/2006 | Cormack | G07F 17/3267 463/16 |
| 7,100,916 | B2 | 9/2006 | Kelly et al. | |
| 7,144,321 | B2 | 12/2006 | Mayeroff | |
| 7,179,166 | B1 * | 2/2007 | Abbott | G07F 17/3295 463/9 |
| 7,278,635 | B2 | 10/2007 | Kelly et al. | |
| 7,303,469 | B2 | 12/2007 | Kaminkow | |
| 7,311,304 | B1 | 12/2007 | Kelly | |
| 7,621,809 | B2 | 11/2009 | Baerlocher et al. | |
| 7,736,223 | B2 * | 6/2010 | Pace | G07F 17/3227 463/19 |
| 7,780,520 | B2 | 8/2010 | Baerlocher | |
| 8,267,773 | B2 | 9/2012 | Jaffe et al. | |
| 8,272,941 | B2 | 9/2012 | Acres | |
| 10,037,657 | B2 | 7/2018 | Acres | |
| 2001/0028147 | A1 * | 10/2001 | Ornstein | A63F 3/00157 273/292 |
| 2001/0049298 | A1 * | 12/2001 | Bennett | G07F 17/3244 463/16 |
| 2002/0132658 | A1 * | 9/2002 | Brown | G07F 17/3244 463/16 |
| 2003/0078101 | A1 | 4/2003 | Schneider et al. | |
| 2003/0119573 | A1 * | 6/2003 | McClintic | G07F 17/32 463/16 |
| 2003/0146574 | A1 * | 8/2003 | Duhamel | G07F 17/3258 273/292 |
| 2003/0153377 | A1 * | 8/2003 | Lisowski, Sr. | G07F 17/3267 463/13 |
| 2004/0002372 | A1 | 1/2004 | Rodgers et al. | |
| 2004/0002377 | A1 | 1/2004 | Staw et al. | |
| 2004/0014515 | A1 | 1/2004 | Tracy et al. | |
| 2004/0038733 | A1 | 2/2004 | Walker et al. | |
| 2004/0048646 | A1 | 3/2004 | Visocnik | |
| 2004/0053660 | A1 | 3/2004 | Webb et al. | |
| 2004/0053666 | A1 | 3/2004 | Vancura | |
| 2004/0072608 | A1 | 4/2004 | Toyoda | |
| 2004/0166936 | A1 * | 8/2004 | Rothschild | G07F 17/32 463/35 |
| 2004/0204216 | A1 * | 10/2004 | Schugar | G07F 17/3244 463/16 |
| 2004/0214628 | A1 * | 10/2004 | Boyd | G07F 17/3267 463/20 |
| 2004/0266511 | A1 * | 12/2004 | Seelig | G07F 17/3216 463/16 |
| 2004/0266517 | A1 | 12/2004 | Bleich et al. | |
| 2005/0014548 | A1 | 1/2005 | Thomas | |
| 2005/0026678 | A1 | 2/2005 | Kaminkow | |
| 2005/0054429 | A1 * | 3/2005 | Baerlocher | G07F 17/32 463/20 |
| 2005/0119052 | A1 | 6/2005 | Russell et al. | |
| 2005/0143164 | A1 * | 6/2005 | Duhamel | G07F 17/3211 463/20 |
| 2005/0148383 | A1 | 7/2005 | Mayeroff | |
| 2005/0159211 | A1 | 7/2005 | Englman | |
| 2005/0164764 | A1 | 7/2005 | Ghaly | |
| 2005/0170888 | A1 | 8/2005 | Sakamoto et al. | |
| 2005/0181860 | A1 | 8/2005 | Nguyen et al. | |
| 2005/0233806 | A1 | 10/2005 | Kane et al. | |
| 2005/0239531 | A1 | 10/2005 | Osawa | |
| 2006/0003825 | A1 | 1/2006 | Iwasaki et al. | |
| 2006/0003826 | A1 | 1/2006 | Walker et al. | |
| 2006/0003835 | A1 | 1/2006 | Olive | |
| 2006/0025201 | A1 | 2/2006 | Van Asdale | |
| 2006/0035705 | A1 | 2/2006 | Jordan et al. | |
| 2006/0040723 | A1 | 2/2006 | Baerlocher et al. | |
| 2006/0040732 | A1 | 2/2006 | Baerlocher et al. | |
| 2006/0040735 | A1 | 2/2006 | Baerlocher | |
| 2006/0046836 | A1 | 3/2006 | Walker et al. | |
| 2006/0049624 | A1 | 3/2006 | Brosnan et al. | |
| 2006/0073877 | A1 | 4/2006 | Rodgers et al. | |
| 2006/0073881 | A1 | 4/2006 | Pryzby et al. | |
| 2006/0082056 | A1 | 4/2006 | Kane et al. | |
| 2006/0084496 | A1 | 4/2006 | Jaffe et al. | |
| 2006/0089195 | A1 | 4/2006 | Walker et al. | |
| 2006/0105837 | A1 | 5/2006 | Walker et al. | |
| 2006/0121971 | A1 | 6/2006 | Slomiany et al. | |
| 2006/0121972 | A1 | 6/2006 | Walker et al. | |
| 2006/0135243 | A1 | 6/2006 | Englman et al. | |
| 2006/0205492 | A1 | 9/2006 | Linard et al. | |
| 2006/0217176 | A1 | 9/2006 | Walker et al. | |
| 2006/0236400 | A1 * | 10/2006 | Gudmundsson | G06Q 20/382 726/25 |
| 2006/0246979 | A1 | 11/2006 | Chim et al. | |
| 2006/0258422 | A1 | 11/2006 | Walker et al. | |
| 2007/0054727 | A1 | 3/2007 | Garamendi et al. | |
| 2007/0054733 | A1 | 3/2007 | Baerlocher | |
| 2007/0060241 | A1 | 3/2007 | Low et al. | |
| 2007/0060269 | A1 | 3/2007 | Ruppert et al. | |
| 2007/0060378 | A1 | 3/2007 | Nelson et al. | |
| 2007/0111776 | A1 | 5/2007 | Griswold et al. | |
| 2007/0123349 | A1 | 5/2007 | Hishinuma et al. | |
| 2007/0167223 | A1 * | 7/2007 | Bleich | G07F 17/32 463/25 |
| 2007/0218970 | A1 * | 9/2007 | Patel | G07F 17/3211 463/16 |

(56) References Cited

U.S. PATENT DOCUMENTS

| | | | | |
|---|---|---|---|---|
| 2007/0218974 | A1* | 9/2007 | Patel | G07F 17/3244 463/20 |
| 2007/0238514 | A1 | 10/2007 | Sato | |
| 2007/0254732 | A1* | 11/2007 | Walker | G07F 17/3244 463/16 |
| 2007/0270115 | A1 | 11/2007 | Kravets | |
| 2007/0275777 | A1 | 11/2007 | Walker et al. | |
| 2007/0293292 | A1* | 12/2007 | Gipp | G07F 17/3211 463/16 |
| 2007/0293308 | A1 | 12/2007 | Jackson et al. | |
| 2008/0045288 | A1 | 2/2008 | Moshal et al. | |
| 2008/0090651 | A1 | 4/2008 | Baerlocher | |
| 2008/0125211 | A1 | 5/2008 | Plowman | |
| 2008/0139274 | A1 | 6/2008 | Baerlocher | |
| 2008/0207313 | A1 | 8/2008 | Acres | |
| 2009/0048012 | A1 | 2/2009 | Patel et al. | |
| 2009/0270168 | A1 | 10/2009 | Englman et al. | |
| 2010/0016071 | A1 | 1/2010 | Jaffe et al. | |
| 2010/0056251 | A1 | 3/2010 | Jaffe et al. | |
| 2010/0124979 | A1 | 5/2010 | Acres | |
| 2010/0234089 | A1 | 9/2010 | Saffari et al. | |
| 2013/0150151 | A1* | 6/2013 | Gagner | G07F 17/326 463/25 |
| 2013/0252734 | A1 | 9/2013 | Gilliland | |
| 2013/0331968 | A1 | 12/2013 | Newton et al. | |
| 2014/0087855 | A1 | 3/2014 | Caputo et al. | |
| 2016/0078727 | A1 | 3/2016 | Acres | |
| 2018/0001195 | A1 | 1/2018 | Watanabe | |
| 2018/0085666 | A1 | 3/2018 | Slabbert et al. | |
| 2018/0308316 | A1 | 10/2018 | Acres | |
| 2019/0088073 | A1 | 3/2019 | Keilwert et al. | |
| 2019/0232166 | A1 | 8/2019 | Fernandez et al. | |
| 2022/0215722 | A1 | 7/2022 | Moore et al. | |

FOREIGN PATENT DOCUMENTS

| | | | | |
|---|---|---|---|---|
| CN | 101094708 | A | | 12/2007 |
| JP | 2007325737 | A | * | 12/2007 |
| WO | 2005107899 | A1 | | 11/2005 |
| WO | 2008063349 | A2 | | 5/2008 |

OTHER PUBLICATIONS

U.S. Appl. No. 16/247,859 now U.S. Pat No. 10,657,767, filed Jan. 15, 2019 (May 19, 2020), John F. Acres (Acres Technology).

U.S. Appl. No. 16/022,261 now U.S. Pat. No. 10,217,321, filed Jun. 28, 2018 (Feb. 26, 2019), John F. Acres (Acres Technology).

U.S. Appl. No. 14/954,233 now U.S. Pat. No. 10,037,657, filed Nov. 30, 2015 (Jul. 31, 2018), John F. Acres (Acres Technology).

U.S. Appl. No. 13/603,793 now U.S. Pat. No. 9,208,637, filed Sep. 5, 2012 (Dec. 078, 2015), John F. Acres (Acres Technology).

U.S. Appl. No. 12/405,824 now U.S. Pat. No. 8,272,941, filed Mar. 17, 2009 (Sep. 25, 2012), John F. Acres (Acres Technology).

* cited by examiner

BONUS WITH PROXIMITY OF OCCURRENCE RELATED TO BASE GAME OUTCOMES OR PAYBACK PERCENTAGE

CROSS-REFERENCE TO RELATED APPLICATIONS

This application is a continuation of U.S. patent application Ser. No. 16/866,975, filed May 5, 2020, which is a continuation of U.S. patent application Ser. No. 16/247,859, filed Jan. 15, 2019, now U.S. Pat. No. 10,657,767, issued May 19, 2020, which is a continuation of U.S. patent application Ser. No. 16/022,261 filed Jun. 28, 2018, now U.S. Pat. No. 10,217,321 issued Feb. 26, 2019, which is a continuation of U.S. patent application Ser. No. 14/954,233 filed Nov. 30, 2015, now U.S. Pat. No. 10,037,657 issued Jul. 31, 2018, which is a divisional application of Ser. No. 13/603,793 filed Sep. 5, 2012, now U.S. Pat. No. 9,208,637, issued on Dec. 8, 2015, which is a divisional application of Ser. No. 12/405,824 filed Mar. 17, 2009, now U.S. Pat. No. 8,272,941 issued Sep. 25, 2012, and claims the benefit of U.S. Provisional Patent Application No. 61/038,314 filed Mar. 20, 2008, the contents of which are hereby incorporated by reference herein for all purposes.

FIELD OF THE INVENTION

This invention relates to novel methods of presenting multi-level mystery bonus awards on games of chance.

BACKGROUND OF THE INVENTION

Playing games of chance is a popular recreational activity. There are many types of games of chance including table games where players wager against a live dealer such as blackjack, z Gow, roulette, Baccarat. Other types of games of chance are offered as automated machines. Examples include slots, poker, bingo, etc. Still other types of games of chance allow players to wager against one another, such as a poker table. In return for a wager, games of chance generate randomly determined outcomes, some of which result in a winning event. Games of chance are often played with wagers having financial value but some games of chance are played with points or other freely available currency having no fiscal worth.

Games of chance may be played in casinos, or at home using electronic devices or mechanical equipment. Gambling via Internet, whether for fun or for money, is also a popular activity.

Games of chance typically associate a winning event with a specific game outcome. For example, achievement of BAR BAR BAR on the payline of a three reel slot machine might pay 20 credits on a 1 credit wager. To increase player interest, bonus awards which are won independently of any single game outcome are sometimes offered. The "mystery" bonus is a popular bonus award that is so named because players cannot easily discern why the award occurred, as it may be completely independent of the game's normal schedule of payments.

Mystery bonuses are awarded as a function of game play and are increasingly likely to be won with each game played. FIG. 1*a*, FIG. 1*b*, and FIG. 2 are indicative of prior art mystery bonus award operation. Here the mystery award is a progressive amount because it grows in value as a function of each wager made until it is won. Once won, the award is initialized to a starting value and the process begins again. FIG. 1*a* depicts the initialization procedure which is executed once upon inception of the mystery award and executed again after each winning occurrence of the mystery award.

A mystery progressive award is defined by a starting and ending (maximum) value. The award must be won before the award grows larger than the maximum value. A winning number W is randomly selected from within the range of all numbers between the starting and ending award values. For example, a mystery progressive starts at $1,000.00 and ends at $5,000.00. A winning value W is chosen, at 110 of FIG. 1*a*, from the range numbers between $1,000.00 and $5,000.00. In this example, W=$2,431.56. The progressive award value is set to the starting value of the award range 120—which is $1,000.00—and the bonus is ready for play as depicted in FIG. 1*b*.

The current award value—$1,000.00—is displayed to players 130 and then a new wager is awaited 140. When a wager occurs, the award value is increased as a function of the wager size 150. A commonly used embodiment adds a percentage of each wager amount to AWARD. For example, AWARD=$1,000.00, a wager of $3.00 is made, and FUNCTION is 3% of wager size. AWARD now grows to $1,000.09, as 3% of $3 is 9 cents ($0.09). AWARD is then tested against W at step 160. Since $1,000.09 is less than $2,431.56, the test fails and the flow chart returns to step 130.

This process continues until cumulative play brings AWARD=$2,431.56, making comparison 160 true and the flow chart passes to step 170 where the winner is identified. The winner in this case is the person whose wager caused AWARD to grow equal to W. The winner is then paid the amount won, $2,431.56 at step 180, after which the mystery award is again initialized 190, which simply executes the steps of FIG. 1*a* again, and the process repeats.

A fixed award mystery bonus works exactly like the progressive mystery bonus award just described, except at step 180, the winner is paid the fixed amount—100 credits for example—instead of the incremented AWARD amount.

FIG. 2 is a prior art four-level progressive mystery bonus display. Enclosure 200 houses the displays and may be configured as an overhead sign, built into the gaming machine, or both. Each display, 210, 220, 230 and 240, represents one progressive mystery bonus award and each grows as a function of wagers made in any gaming machine linked to these awards. Each of the four award values has a winning number W chosen for it during initialization and each award is won independently of the others.

The range for each progressive award 250, 260, 270, and 280 are made known to players so they may understand that, as each progressive award grows, it is more likely to be won.

When one of the mystery awards is won, the winning display immediately begins to alternate every few seconds between the progressive bonus amount won and the winning machine identifier. After the award amount is paid to the winner, either automatically as credits placed on the winning machine or as a manual payment of cash or check directly to the player, the won mystery progressive award is reset to its starting value and again grows as wagers are made in the associated games of chance.

In another embodiment of the prior art, a light or other indicator is placed on, or near each machine in the link. When a win occurs, the winning machine indicator is activated, and remains active, until the award is paid. Because there are so many numbers, multi-level mystery progressives are confusing to many players and this limits their appeal.

While the growing award amount, and the corresponding increased likelihood that a win will occur, creates drama and therefore enhances entertainment value to the player, the win occurrence itself is anticlimactic to everyone but the winner because the amount won is known the instant the win occurs.

Effectiveness of multi-level mystery bonus awards is limited by the confusion of displaying multiple bonus award values and player enjoyment would increase if such displays are simplified.

Further, many players grow frustrated if there is a long period of play between wins.

Other players prefer to have longer periods between winning events but to have winning events that are larger or occur in clusters. It would be desirable for the casino to be able to configure the timing of the next mystery bonus award. It would also be desirable to associate a frequency of awarding the mystery bonus to base game outcomes, for example, or to associate the frequency of awarding the mystery bonus to payout percentages of the base game.

Players would enjoy a heightened sense of entertainment if they know that an award is won before the winner identity and bonus amount won are revealed.

In mystery bonus awards that are a function of wagers made, it would be useful to illustrate that larger wagers have a greater likelihood of winning.

In mystery bonus awards, it would heighten player enjoyment to have an indication of how close the next mystery award is to being won.

DETAILED DESCRIPTION OF THE INVENTION

Though my invention is equally useful with table games and gaming machines, the following discussion describes its use with gaming machines only. I do this solely for clarity of explanation as the manner of operation on any game of chance—table game or gaming machine—is very similar and my claims regarding this invention should in no way be limited by this clarification. My invention is also useful in Internet gambling and computer games that simulate wagering.

I define "mystery bonus" as a system that selects awards as a function of game play events, excluding specific individual game outcomes. My definition of a mystery bonus does not include an award that is paid simply because a single gaming machine outcome resulted in a specific result, such as BAR BAR BAR on a three reel slot machine, as that is a normal jackpot occurrence. A mystery bonus could be, however, paid on the $11^{th}$ occurrence of BAR BAR BAR. It will be appreciated by one of skill in the art that there are many methods and techniques for determining when a mystery award occurs. Although I may choose to describe a particular embodiment while teaching how my invention functions, I do not limit the claims of my invention to only that embodiment.

In addition, the winner does not have to be the person whose game play caused the winning condition to be met. The award could be paid to the tenth person that makes a wager after the win occurs, the person that placed the wager prior to the wager that met the winning condition, etc. One of ordinary skill will recognize that many such variations are possible and may be used with my invention.

Figure 1A:
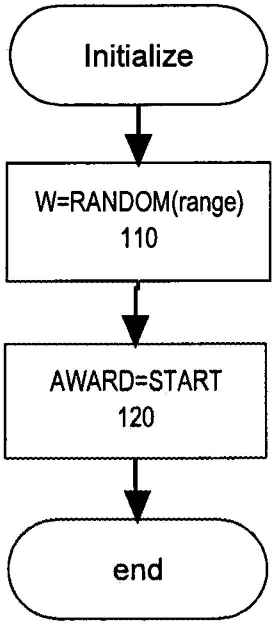
FIG. 1*a* is a prior art flow chart for initializing a progressive mystery bonus award.
Figure 1B:
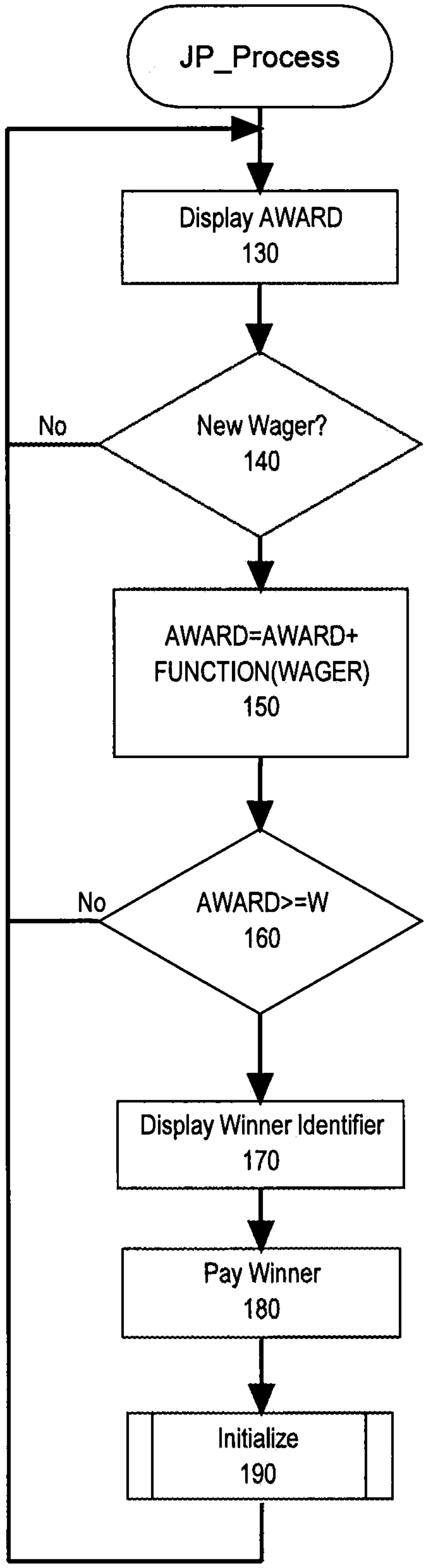
FIG. 1*b* is a flow chart for implementing a progressive mystery bonus award.
Figure 2:
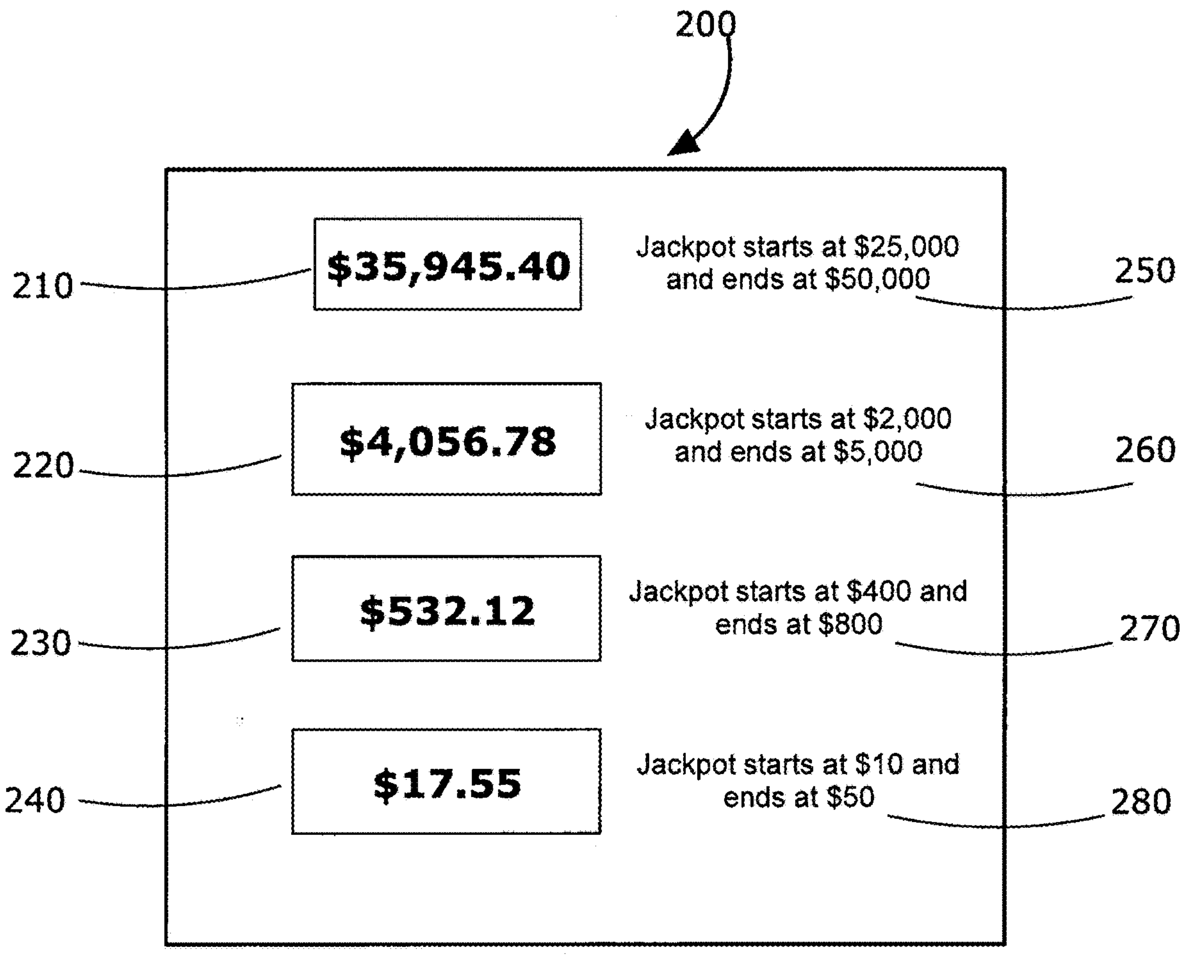
FIG. 2 illustrates a prior art four-level progressive mystery award display.
Figure 3:
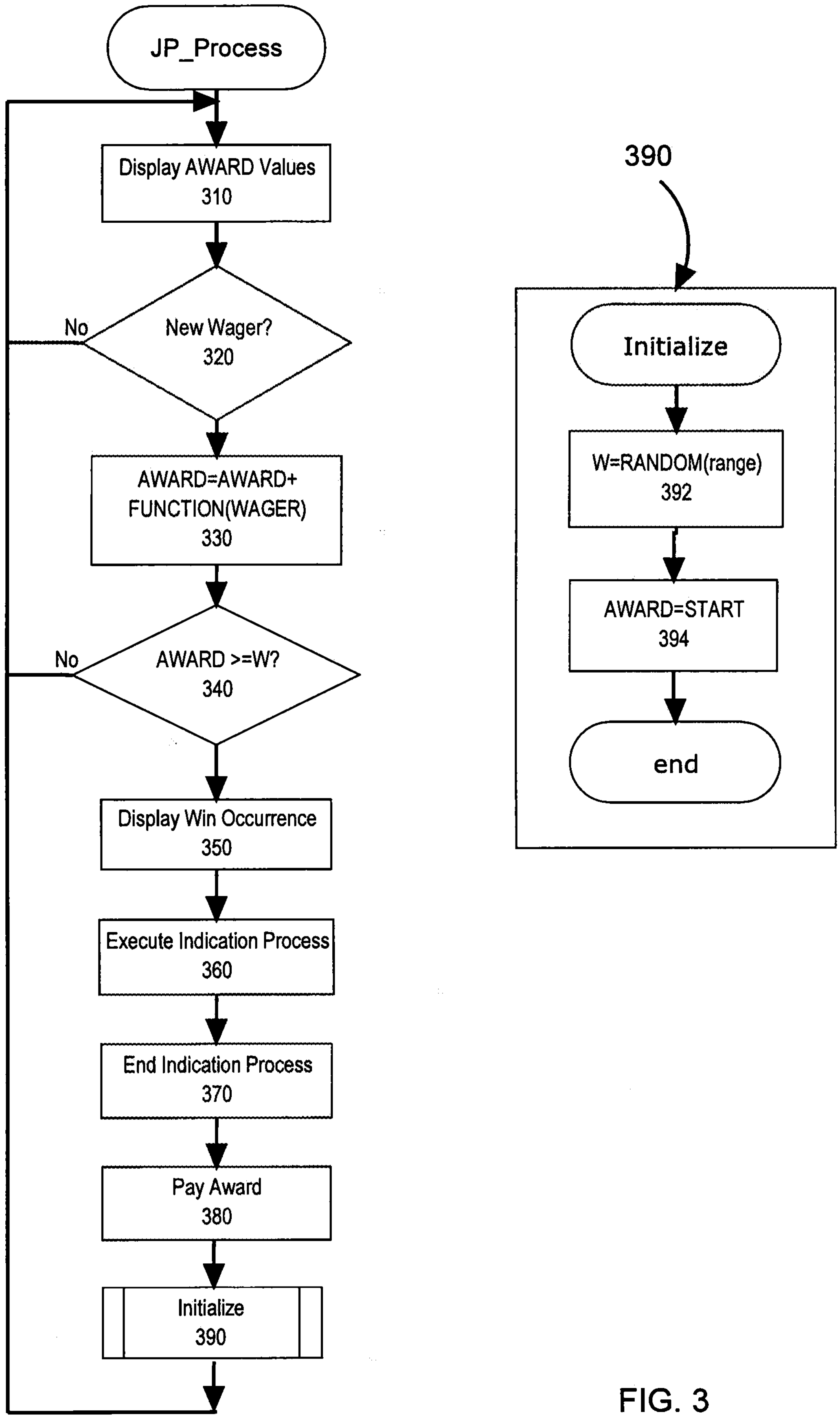
FIG. 3 is a flow chart of a preferred embodiment of my invention.

FIG. 3 is a flow chart depicting my invention and represents a process for a four-level mystery jackpot award. As one of skill in the art will readily understand, each of the four mystery awards must be processed independently. FIG. 3 shows the logical flow of the award process so as to emphasize the unique attributes of my invention. Moreover, while the process shown describes a progressive mystery bonus award; the concepts of my invention apply equally to fixed value mystery awards.

Each of the four AWARD values are displayed 310 and then a new wager is awaited 320. When a wager occurs, the amount of each of the four jackpot award amounts are increased as a function of wager amount 330, after which each AWARD amount is tested against the value W already chosen for that AWARD level 340. If no AWARD amount has grown to at least equal its associated value of W, the process returns to step 310 and displays updated AWARD values.

After one of the AWARD values has grown sufficiently, players are made aware of the win occurrence 350. Next an indication process 360 is executed in which at least two of the four award values are indicated to players in a sequence. In a preferred embodiment of my invention, less than all of the award values are indicated at any one time. When the indication process ends 370, the award value that was won remains indicated, letting players know the amount won. The indicated award is then paid to the winning player 380, after which the award won is re-initialized 390 and the process repeated.

In PCT/US2007/000417 filed Jan. 4, 2007, which is incorporated by reference for all purposes, I described a process by which a bonus wheel could be triggered independently of the standard base game outcome. This process allows selection of virtually any desired hit frequency of the bonus wheel and further guarantees the player that a win will occur within a specified number of games. A graphical win proximity indicator may indicate, with each subsequent play, that a bonus wheel win is more likely.

In one embodiment, a desired bonus wheel hit frequency can be selected such as 1/60, for example. In other words, on average, the bonus wheel is won once every 60 times the standard base game is played. To accomplish this, a value W can be chosen from the integer range of 1 to 2N, where N is the desired average win frequency. When an average win frequency of 1 time in 60 base games is desired, the random number may be selected from the integer range of 1 to 120. For example, if W is selected to be 55, a counter C may be initialized to zero and incremented by one each time a qualifying game is played. When the $55^{th}$ qualifying game is played, the bonus wheel is won. Even though the value W is preferably held secret from the player, the game could indicate how close the player is reaching W or how close the player is reaching the maximum possible value 2N, by which time bonus wheel win is guaranteed.

Figure 3A:
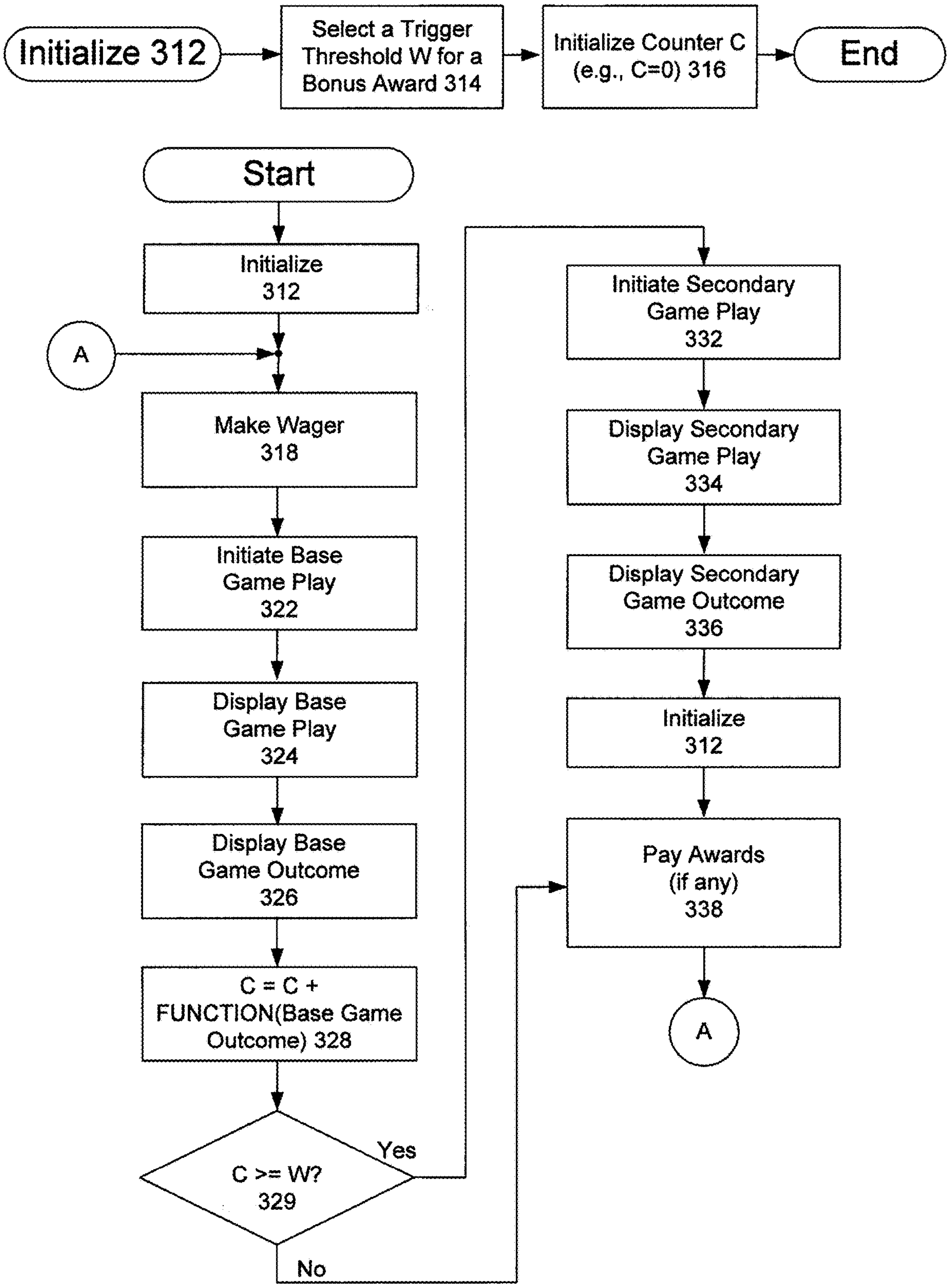
FIG. 3*a* is a flow chart depicting another embodiment of my invention and represents a process for determining a mystery jackpot award based on one or more outcomes of a base game.

FIG. 3*a* is a flow chart depicting another embodiment of my invention and represents a process for determining a mystery jackpot award based on one or more outcomes of a base game.

In some embodiments, the counter C may be increased by one each time a qualifying base game occurs, regardless of payback percentage of the base game or base game outcome. This may be expressed as C=C+1, each time another qualifying base game occurs. After each increment, C may be compared to W to see if C=W. If true, the bonus wheel—or some other bonus award—may be awarded. The terms “bonus wheel,” “bonus award,” “mystery jackpot,” “mystery award,” and the like, generally refer to the same or similar event associated with when C bears a predefined relationship to W, or some other triggering event that changes game play away from the standard base game, or some other event otherwise associated with awarding a bonus. Use of one term is not intended to limit the applicability of any of the other terms used herein. At the time of initialization, C=0. After one qualifying game, C=1; after another qualifying game, C=2, etc. This pattern may continue until C grows equal to W. When that occurs, the bonus wheel may be awarded. Thereafter, a new value of W may be randomly selected from the range of 1 to 2N, and C may be initialized back to zero, and the process begins again.

In another embodiment, the formula C=C+1 may be modified to account for particular base game outcomes. As shown in FIG. 3*a*, the process may begin by initializing at 312 particular values such as the threshold W at 314 and the counter C at 316. Thereafter, a player begins by making a wager at 318 and initiating play of a base game at 322. The play of the base game can be displayed at 324 to the player along with the base game outcome at 326. One of skill in the art will readily understand that the steps in the flow chart need not occur in the order as shown, as further explained below. The counter C may be incremented or otherwise increased according to a function of the base game outcome as represented by FUNCTION(base game outcome) at 328.

For example, the counter C may be incremented only on winning outcomes of the base game. Alternatively, the counter C may be incremented only on losing outcomes of the base game. Several other embodiments are possible, including, for example: incrementing C more rapidly in proportion to the amount won; incrementing C more rapidly in inverse proportion to the amount won; incrementing C after at least X losing outcomes of the base game; incrementing C after at least X winning outcomes of the base game; incrementing C only when certain symbols appear on the base game; and incrementing C only when certain symbols don’t appear on the base game.

Not only can the counter C be incremented, but it can also be decremented. For example, the counter C may be decremented when certain events or conditions occur that are associated with the base game, or when certain events or conditions don’t occur. The counter C may be decremented more rapidly when large wins of the base game occur.

This may be advantageous to the casino owner because if a player is winning large amounts on the base game, it may not be desirable to award the mystery bonus because the player may already be sufficiently captivated by the large wins on the base game.

Other conditions can be imposed for winning the mystery bonus award. For example, a consecutive number of base games without appearance of a specific symbol or symbols may be required for the mystery bonus to be awarded. Similarly, an appearance of a certain symbol at least once during the base game may be required.

A determination can be made at 329 whether the counter C is greater than or equal to the threshold W, and if greater than or equal to W, the mystery bonus will be awarded. In some embodiments, the mystery bonus award may be triggered upon a new base game being played at 322, after a base game result is known, after the game play at 324, or when the base game outcome is made known to the player at 326. In other words, the determination made at 329 can occur at any time and need not occur in the order shown in FIG. 3*a*.

The counter C can be tested against W at the start of each base game. For example, incrementation of C may occur based upon the result of one base game, but tested against W at the start of another base game. In this scenario, the mystery bonus would be won at the start of a base game, even though the result of the previous base game causes the incrementation of the counter C. Alternatively, the counter C may be tested against the threshold W immediately after incrementation of C after the base game outcome is known, as shown at boxes 328 and 329 of FIG. 3*a*. Other such rearrangements of the elements of the method can also be made while still achieving the purposes and desired aspects of the invention. The mystery bonus award can include the opportunity to play a secondary game or bonus award game, among other possibilities. Where the mystery bonus award includes playing the secondary game, the secondary game can be initiated at 332 and displayed during game play at 334. The outcome of the secondary game can then be displayed at 336. The process of initializing may then be performed at 312, which may cause another threshold W to be selected at 314 and the counter C to be set to zero at 316. As previously mentioned, the various boxes, including the initialization at 312, need not occur in the precise order illustrated. After the outcome of the secondary game is displayed at 336, any awards may be paid at 338. For example, any award associated with the base game may be paid in addition to any bonus award. Alternatively, if the determination is made at 329 that the counter C does not correspond to the mystery bonus award, then any awards of the base game can be paid at 338 without awarding the mystery bonus award.

Combinational triggers (not shown) may also be used to initiate or award the mystery bonus based on two or more conditions. For example, the mystery bonus award may not be triggered unless there have been three losing outcomes of the base game in addition to the counter C being greater than or equal to the threshold W. One of skill in the art will recognize that many such combinations may be used. The conditions for triggering the mystery bonus award may include, for example: non-winning outcomes of the base game, specific losing outcomes of the base game, specific winning outcomes of the base game, date or time of day, among other possibilities. Once all designated conditions are met, the mystery bonus can be awarded immediately upon the start of the base game that caused the conditions to be met, upon the end of the base game that caused the conditions to be met, upon the start of a subsequent base game, or upon the ending of a subsequent base game.

Figure 3B:
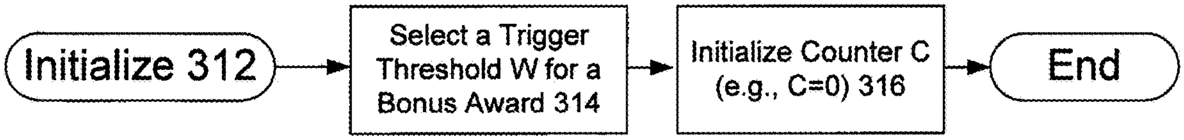
FIG. 3*b* is a simplified flow chart depicting another embodiment of my invention and represents a process for determining a mystery jackpot award based on one or more outcomes of a base game.
Figure 3B:
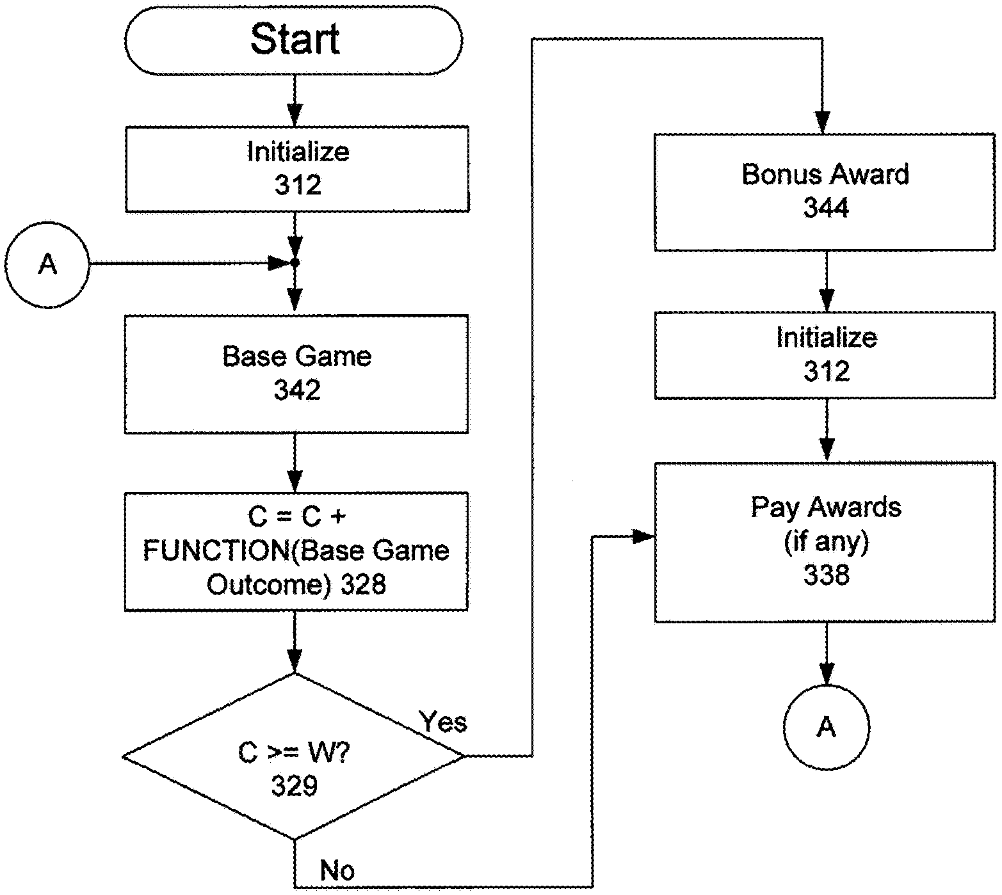

FIG. 3*b* is a simplified flow chart depicting another embodiment of my invention and represents a process for determining a mystery jackpot award based on one or more outcomes of a base game.

Similar to FIG. 3*a*, the formula C=C+1 may be modified to account for particular base game outcomes. As shown in FIG. 3*b*, the process may begin by initializing at 312 particular values such as the threshold W at 314 and the counter C at 316. Thereafter, a player begins by playing a base game at 342. The counter C may be incremented or otherwise increased according to a function of the base game outcome as represented by FUNCTION(base game outcome) at 328. Any of the base game outcomes discussed with reference to FIG. 3*a* may likewise apply to the incrementation of the counter C at 328 with reference to FIG. 3*b*, and similar conditions may cause the mystery bonus to be awarded at 329 of FIG. 3*b*. In addition, the mystery bonus award can include the opportunity to play a secondary game, among other possibilities. For example, the secondary game can be played at 344 in association with the mystery bonus 344 that was awarded. The elements of FIG. 3*b* that are similar to those discussed with reference to FIG. 3*a* may also function in a similar manner as previously described; therefore, a detailed description of such elements will be omitted for the sake of brevity. Any rearrangements of the elements of the method shown in FIG. 3*b* can also be made while still achieving the purposes and desired aspects of the invention.

Figure 3C:
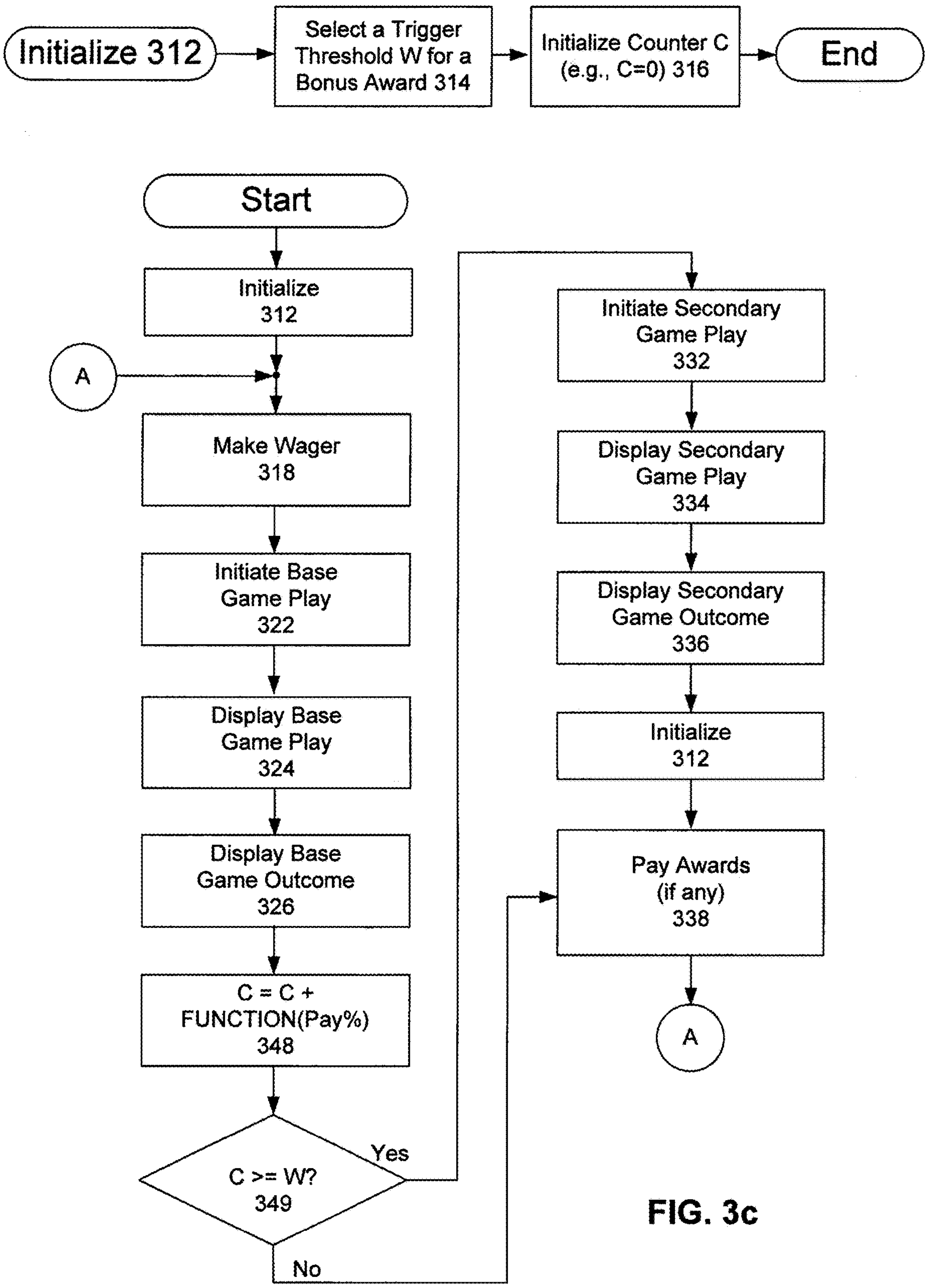
FIG. 3*c* is a flow chart depicting yet another embodiment of my invention and represents a process for determining a mystery jackpot award based on the percentage payback of one or more base games.

FIG. 3*c* is a flow chart depicting yet another embodiment of my invention and represents a process for determining a mystery jackpot award based on the percentage payback of one or more base games.

As previously mentioned, the formula C=C+1 may be modified to account for particular base game outcomes. Alternatively (or in addition), this formula may be modified to account for base game payback percentages. For example, the mystery bonus award may have a greater likelihood of being won if the payback percentage of the base game is low. In this embodiment, the FUNCTION(Pay %) illustrated at 348 of FIG. 3 may correspond to the following formula: $C=C+K\cdot(1-\text{Pay }\%)$, where K is a selected constant and Pay % is payback percentage of an associated base game. Suppose K=10 and Pay %=0.88. Inserting such values into the formula yields: $C=C+10\cdot(1-0.88)$, which can be reduced to $C=C+10\cdot 0.12$, and ultimately becomes C=C+1.2. Because the value of C no longer grows along integer boundaries, C may now be tested to determine whether C is greater than or equal to W, where W is a threshold for winning the mystery bonus award. In other words, if C>=W then the mystery bonus is awarded.

As mentioned above, the threshold W can be chosen from an integer range of 1 to 2N, where N is the desired average win frequency of the mystery bonus award. Presuming the value of N remains at 60, W may be chosen within the range of 1 to 120, but C is growing more quickly toward W. Instead of taking a maximum of 120 qualifying base game plays to win, it now takes only 100. In other words, the mystery bonus award will occur on average 1 time in 50 base games instead of 1 time in 60 base games.

Now presume Pay %=92%. Using the same formula, $C=C+K\cdot(1-\text{Pay }\%)$, and supposing that K=10, the formula ultimately yields C=C+0.8. In this embodiment, it now takes a maximum of 150 qualifying standard game plays to win the mystery bonus award, resulting in the mystery bonus award occurring on average 1 time in 75 base games.

As the standard base game payouts are liberalized, the mystery bonus award may become harder to win. Conversely, as the standard base game payouts are restricted, the mystery bonus award may become easier to win. One of skill in the art will recognize that by changing the value of K, the relative effect of a changed payback percentage can be altered. It should also be understood that additional formulas can be used to achieve substantially the same effect, and the embodiments of this invention as described herein are directed toward modifying the frequency of awarding a mystery bonus as payback percentage is changed regardless of the specific calculation used. For example, the FUNC- TION(Pay %) at 348 may use the following formula: C+K·Pay %, which increases the frequency with which the mystery bonus award is won as payback percentage increases. As will be discussed in additional detail below, still other embodiments of the formula may be used.

A determination can be made at 349 whether the counter C is greater than or equal to the threshold W, thereby indicating that the mystery bonus will be awarded. The determination made at 349 can occur at any time and need not occur in the order shown in FIG. 3*c*. The elements of FIG. 3*c* that are similar to those discussed in FIG. 3*a* may also function in a similar matter as previously described; therefore, a detailed description of such elements will be omitted for the sake of brevity. Any rearrangements of the elements of the method shown in FIG. 3*c* can also be made while still achieving the purposes and desired aspects of the invention.

Figure 3D:
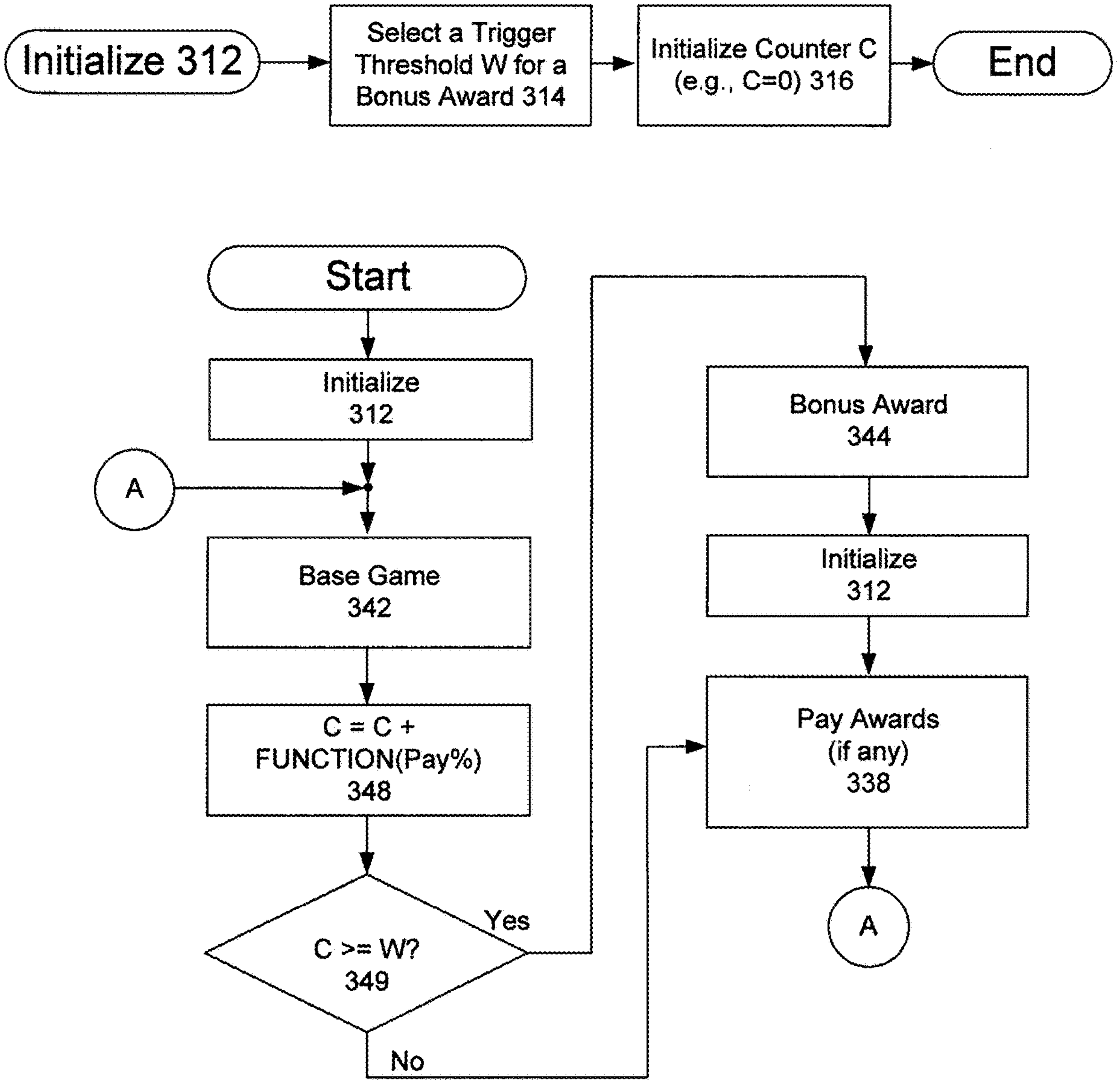
FIG. 3*d* is a simplified flow chart depicting another embodiment of my invention and represents a process for determining a mystery jackpot award based on the percentage payback of one or more base games.

FIG. 3*d* is a simplified flow chart depicting another embodiment of my invention and represents a process for determining a mystery jackpot award based on the percentage payback of one or more base games.

Similar to FIG. 3*c*, the formula C=C+1 may be modified to account for base game payback percentages. As shown in FIG. 3*d*, the process may begin by initializing at 312 particular values such as the threshold W at 314 and the counter C at 316. Thereafter, a player begins by playing a base game at 342. The counter C may be incremented or otherwise increased according to a function of the payback percentage of the base game as represented by FUNCTION (Pay %) at 348. Any of the formulas discussed with reference to FIG. 3*c* may likewise apply to the incrementation of the counter C at 348 with reference to FIG. 3*d*, and similar conditions may cause the mystery bonus to be awarded at 349 of FIG. 3*d*. In addition, the mystery bonus award can include the opportunity to play a secondary game, among other possibilities. For example, the secondary game can be played at 344 in association with the mystery bonus 344 that was awarded. The elements of FIG. 3*d* that are similar to those discussed with reference to FIG. 3*c* may also function in a similar manner as previously described; therefore, a detailed description of such elements will be omitted for the sake of brevity. Any rearrangements of the elements of the method shown in FIG. 3*d* can also be made while still achieving the purposes and desired aspects of the invention.

Figure 3E:
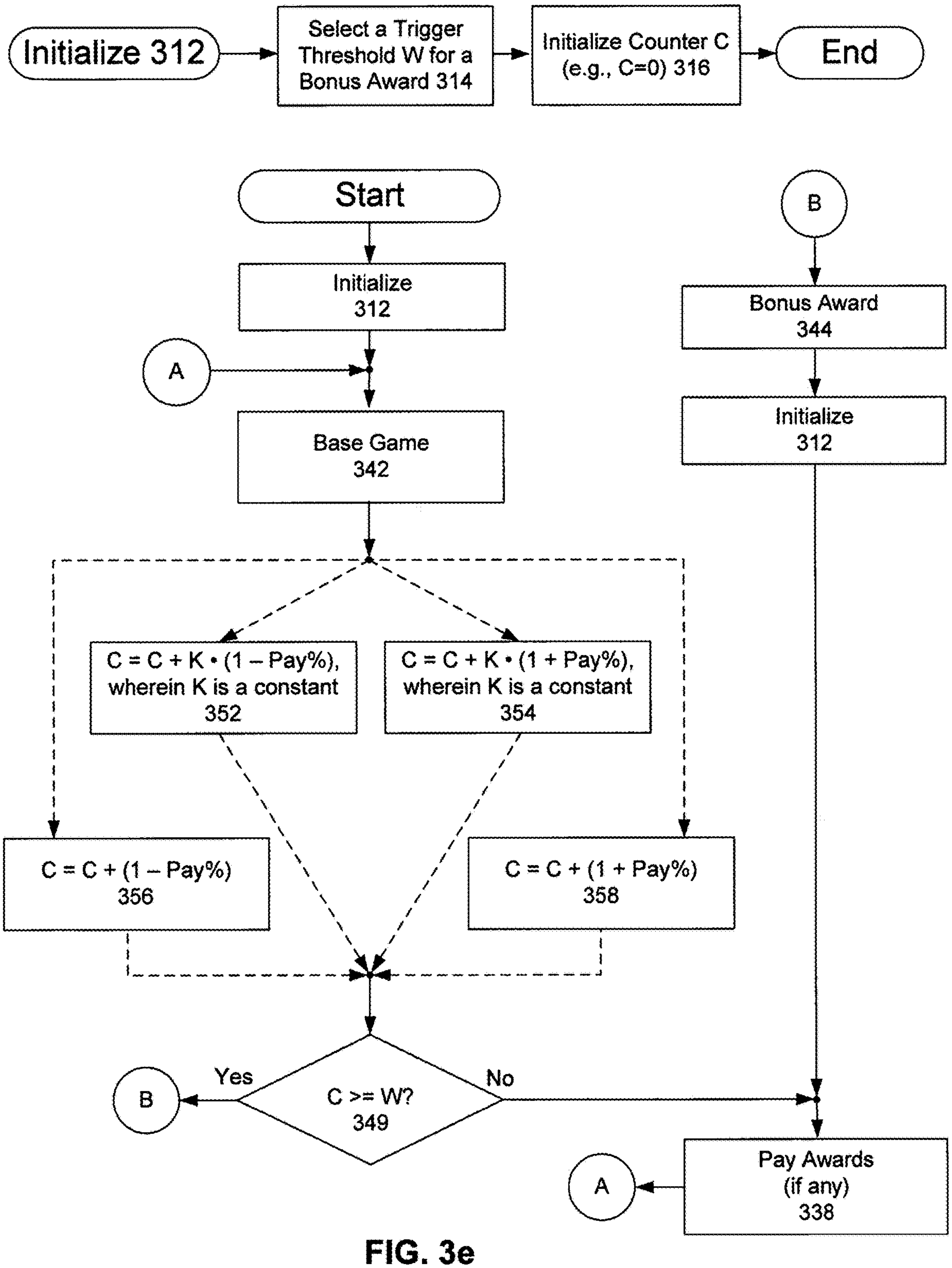
FIG. 3*e* is a more detailed flow chart depicting another embodiment of my invention and represents a process for determining a mystery jackpot award based on the percentage payback of one or more base games.

FIG. 3*e* is a more detailed flow chart depicting another embodiment of my invention and represents a process for determining a mystery jackpot award based on the percentage payback of one or more base games.

In this embodiment, one of several paths can be taken associated with different formulas for incrementing the counter C. For example, after the base game 342, the counter C may be incremented according to one of the following formulas: C=C+K·(1−Pay %) as illustrated at 352; C=C+K·(1+Pay %) as illustrated at 354; C=C+(1−Pay %) as illustrated at 356; and C=C+(1+Pay %) as illustrated at 358. A determination can then be made at 349 whether the counter C is greater than or equal to the threshold W, and if so, path B is taken thereby indicating that the mystery bonus will be awarded at 344 after which the initialization may occur at 312.

Alternatively, if the determination is made at 349 that the counter C does not correspond to the mystery bonus award, then any awards of the base game can be paid at 338 without awarding the mystery bonus award. In any case, once any awards are paid at 338, path A is taken and the process may return to the base game 342 as shown. The determination made at 349 can occur at any time and need not occur in the order shown in FIG. 3*e*. Other similar rearrangements of the elements of the method can also be made while still achieving the purposes and desired aspects of the invention. While four different formulas are illustrated in FIG. 3*e*, any number of formulas may be used to accomplish the purposes described herein. The elements of FIG. 3*e* that are similar to those discussed with reference to FIG. 3*d* may also function in a similar manner as previously described; therefore, a detailed description of such elements will be omitted for the sake of brevity.

Multi-Segmented Bonus Wheels

Figure 4:
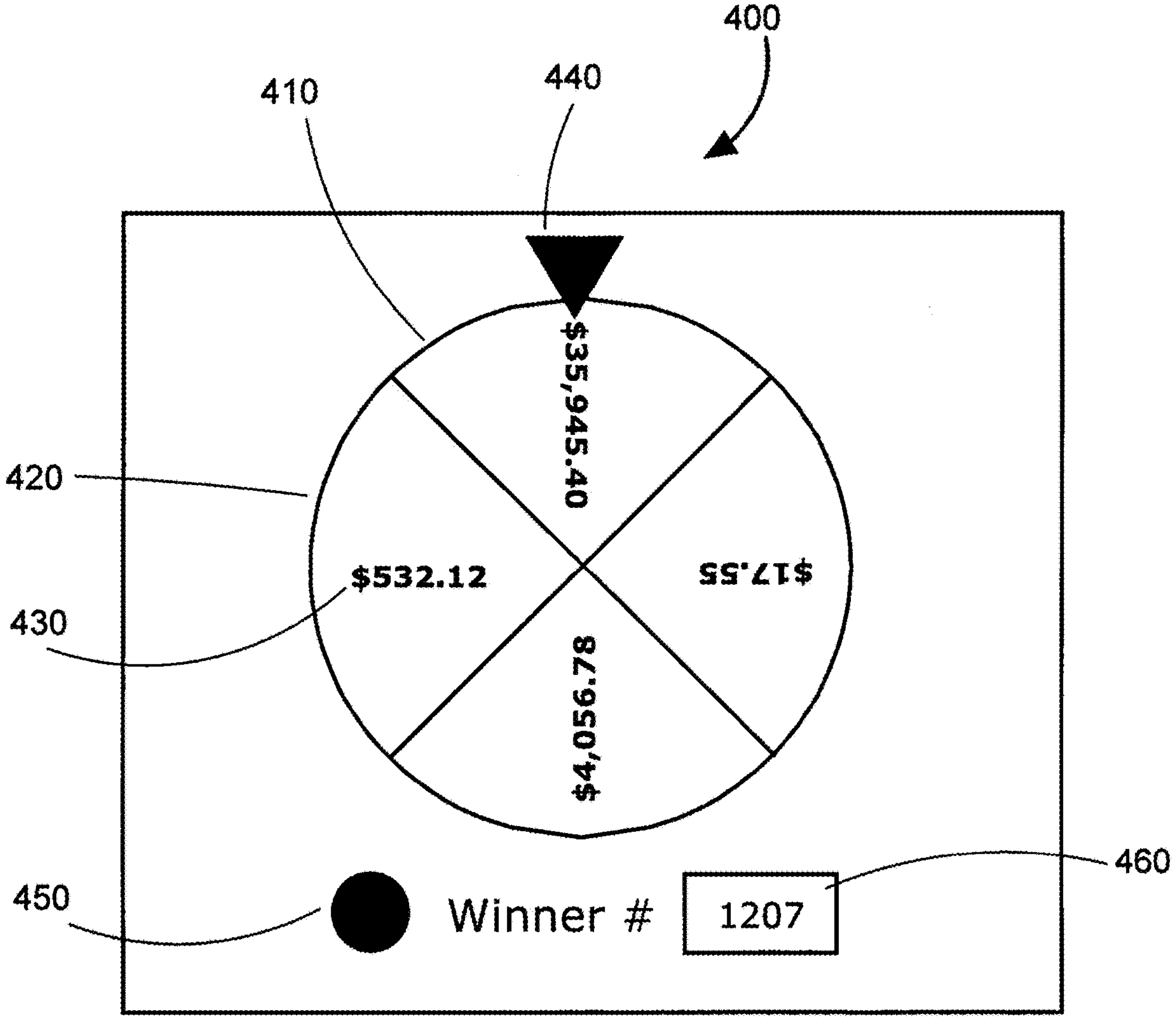
FIG. 4 illustrates a four-level progressive mystery award using a video-based wheel indicator according to my invention

FIG. 4 represents a display which is useful for implementing the steps just described. A video display 400 displays a wheel 410. Each wheel segment 420 holds one of the four progressive bonus award values 430. During normal play, the wheel is stationary. After a win occurs at 350 of FIG. 3, win Indicator 450 illuminates to inform players of the win occurrence. Next, wheel 410 begins to spin. Each award amount is indicated in turn as it rotates into alignment beneath pointer 440. The wheel then slows and finally stops, indicating the award won by stopping with that amount directly beneath pointer 440. In a preferred embodiment, corresponding sound effects accompany the win occurrence, wheel spin and celebration sequence after the wheel stops.

In a preferred embodiment of my invention, the winner identity is not disclosed until a time period after the amount won is made known. Referring again to FIG. 4, winner identifier 460 delays disclosure of the winner identity until several seconds after wheel 420 comes to rest and the amount won is known.

In an alternative embodiment, the winner is identified before the winning amount is made known. In yet another embodiment, the winner identity and bonus amount won are identified simultaneously.

Win Proximity Indicator

Figure 5:
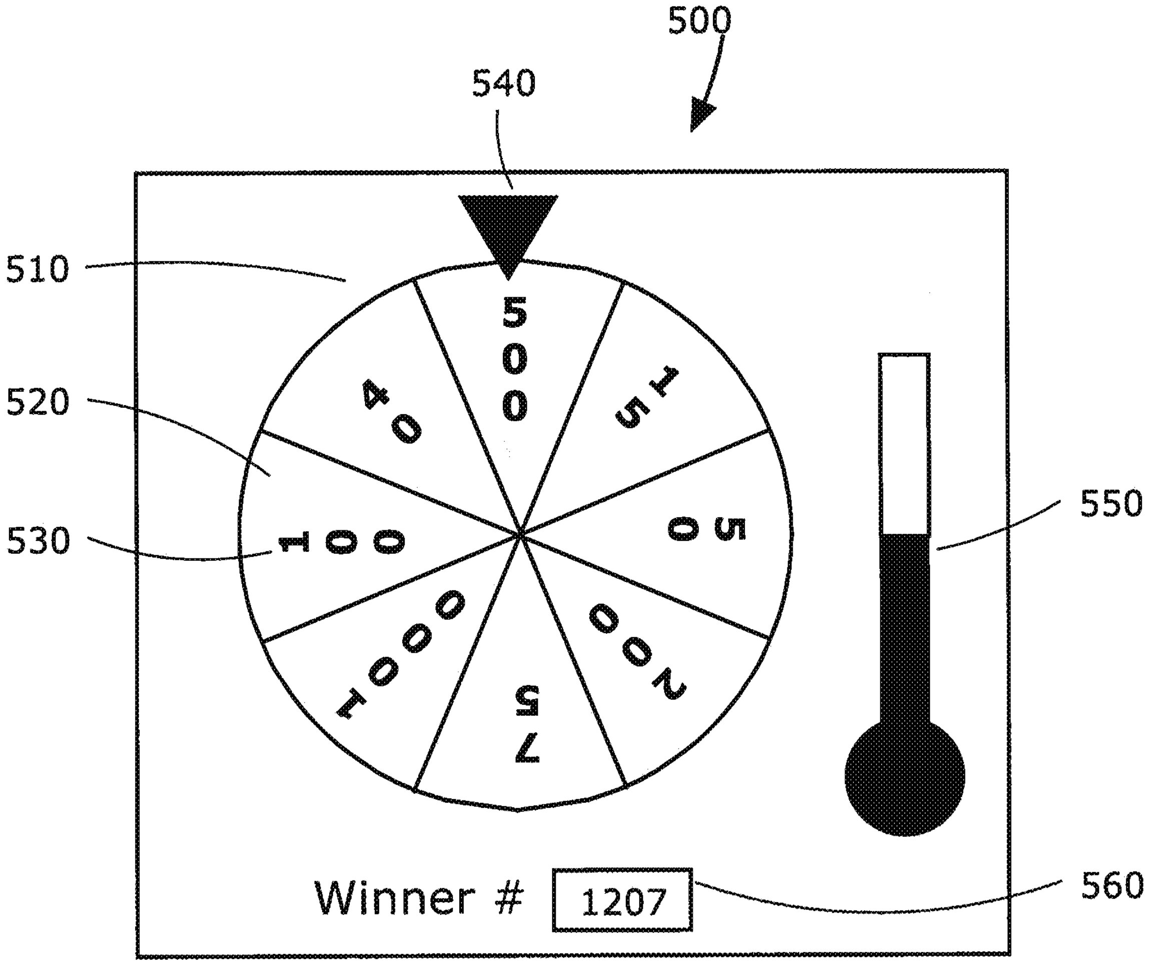
FIG. 5 illustrates an eight-level fixed-award mystery award using a video based wheel indicator, winner identifier and win indicator according to my invention.

FIG. 5 is a video display of a wheel 510 which is divided into 8 segments 520, each containing a fixed award amount 530. Win proximity indicator 550—which in this embodiment is shaped like a thermometer—informs players of the proximity of the next mystery bonus award, as well as announcing each winning event. Upon initiation, the thermometer is set very low, indicating a winning event is not imminent. As wagers are made, the thermometer rises, indicating a winning event is growing closer. When a winning event occurs on any of the eight mystery bonus awards, the thermometer rises fully to the top and begins to flash, alerting players that a win occurred. After a period of time wheel 510 spins and stops, positioning the winning value beneath pointer 540. Winner identifier 560 identifies the winner and award payment is completed.

The purpose of win proximity indicator 550 is to show, in a non-numeric way, that a mystery win is growing closer with each wager. In one embodiment, the thermometer is lit in proportion to how much progress has been made toward the next winning event.

Suppose a winning number W is selected from a range of 1 to 1,000 and a counter C, is increased by one count for each unit of wager made. That is, the counter is increased by 3 for each 3 credit wager made, 2 for each 2 credit wager made, etc. Now presume that, upon initialization C=0 and W=400, causing win proximity indicator 550 to indicate its lowest value because the win is far from occurring.

As wagers are made, C grows and win proximity indicator 550 rises in proportion to the percentage of progress C has made from its starting point to reaching the value of W. For example, after 100 credits are wagered, C=100 and is 25% of the way to a win. At this point the win proximity indicator has risen about 25% of the way to the top. Win proximity indicator height is recalculated after each wager, thereby providing players with a real sense of how quickly the next mystery bonus award will next occur.

FIG. 5 indicates 8 different fixed-value mystery awards. Win proximity indicator 550 always represents progress toward the nearest winning occurrence. When that award is accomplished, the win proximity indicator is reset to indicate the next nearest win occurrence. Therefore win proximity indicator 550 will rarely indicate its lowest value because when one win occurs, another win has also grown towards its winning value. This technique gives powerful incentive for players to continue to play and chase the next available mystery bonus award.

In another embodiment win proximity indicator 550 indicates progress toward the maximum theoretical value of W. In the above example, the largest value W could be is 1,000. When C=100 win proximity indicator 550 displays as 10% toward the top since 100/1000=10%.

Those of skill in the art will recognize these as just two algorithms for using a win indicator to represent progress toward a mystery win and that many other algorithms are possible.

Audio signals may be used to augment or replace the function of the win proximity indicator, the winner identifier, or both. For example, winner identity is announced using a live or recorded voice, and win proximity indicator functions are performed as a changing pitch, timbre or content of sound. One of skill in the art recognizes there are many other mechanisms by which to electronically, mechanically or electromechanically indicate the functions of the win amount, win proximity, win occurrence indicator and winner identity. All such methods are useful with my invention.

Mechanical Bonus Displays & Alternative Win Proximity Indicator

Figure 6:
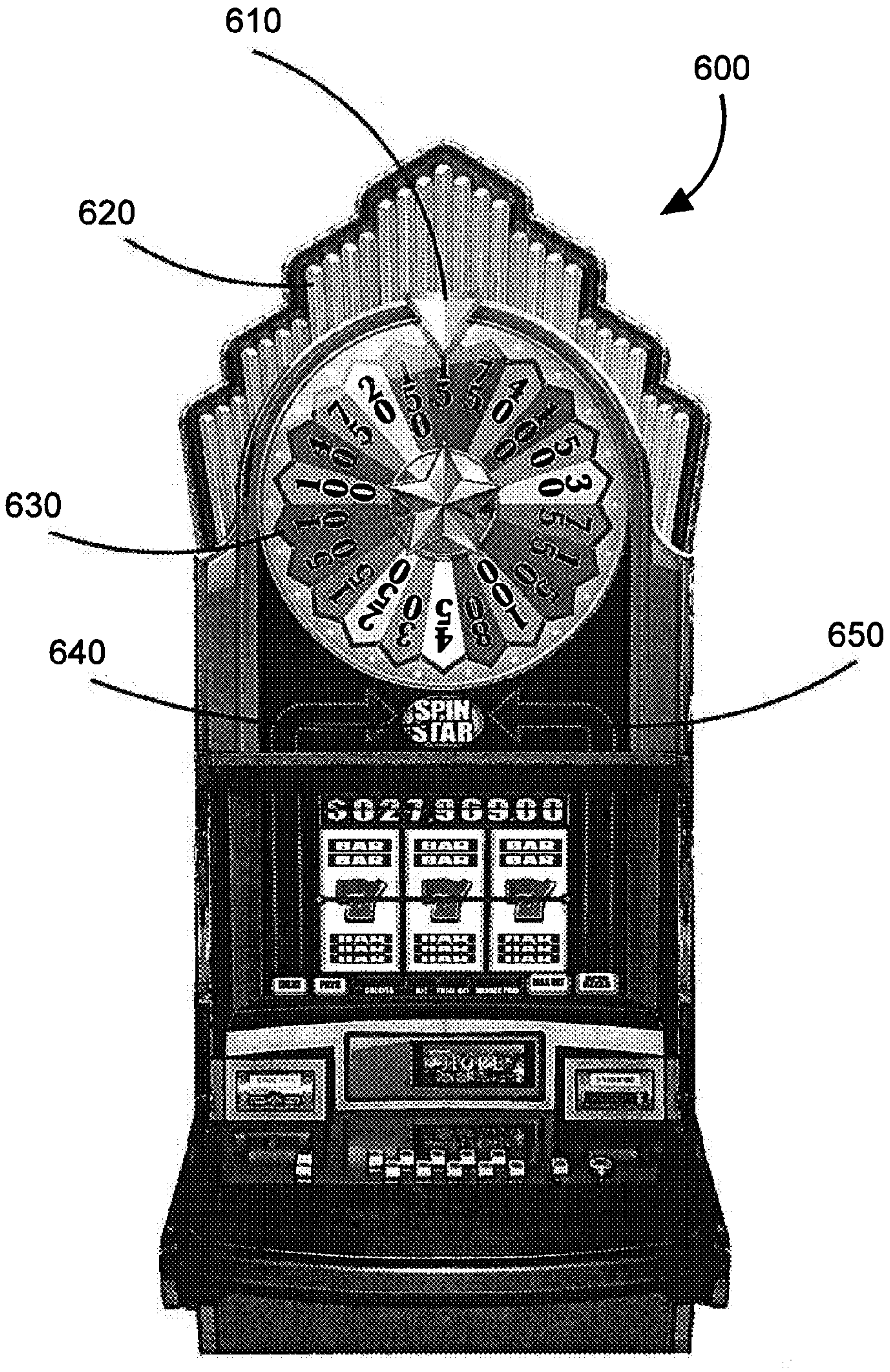
FIG. 6 illustrates a 22-level fixed award mystery award using a mechanical wheel indicator with illuminated indications of proximity to the next mystery award win, and illuminated indicator of wager size according to my invention.

FIG. 6 depicts a mechanical wheel embodiment of my invention implemented using a Bally CineVision gaming machine 600. Mechanical wheel 630 includes 22 segments, each containing a fixed mystery bonus award. Pointer 610 indicates the winning amount. Win proximity indicator 620 is a crown of crystals. Each crystal of the crown is equipped with a multi-color illumination source. When the game is initialized, the crown is colored an icy-blue, indicating an award is not imminent. The crown illumination turns from icy-blue to reddish to bright red as a mystery win grows closer and closer. When a win is struck, the crown turns red and flashes, indicating a win occurred. Those of skill in the art will recognize that other color and brightness patterns may be utilized to represent the nearness of a mystery win and that win proximity indicator 620, though different in visual appearance, performs the same function as thermometer shaped win proximity indicator 550 of FIG. 5 and is adaptable to the same functional embodiments.

Once a win occurs, wheel activation button 640 illuminates. When the player presses the button, wheel 630 spins, slows and ultimately stops in such a position that the won mystery bonus amount is positioned directly beneath pointer 610.

Although the wheel depicted in FIG. 6 contains only fixed value mystery awards, one of skill in the art readily understands that some, or all, of the fixed award values could be replaced with progressive award amounts. One skilled in the art will further understand that wheel activation button 640 could be eliminated and wheel 630 automatically spun, either immediately upon a win being struck or after a time delay. In an alternative embodiment, wheel 630 could spin after a win occurs and wheel activation button 640 is pressed or a predefined period of time has passed, whichever occurs first.

While the examples of my invention that I presented above describe a wheel rotating beneath a fixed pointer, one of skill in the art will readily understand that other methods of indicating a winning amount on a wheel are possible. For example, the wheel could remain stationary while the pointer revolves around it, much like a roulette ball rotates around a roulette table. The amount indicated on the wheel segment that is aligned with the pointer when it comes to rest is the amount won.

Alternately, the wheel and the pointer could simultaneously rotate, either in the same direction or opposite directions. The amount indicated on the wheel segment that is aligned with the pointer when both wheel and pointer come to rest is the amount won.

When a fixed pointer is used, it need not be at the top of the wheel but could be located anywhere around the circumference of the wheel. In another embodiment, a player is allowed to choose one pointer from a plurality of pointers. After pointer selection is made, the wheel is spun. The award amount that is aligned with the chosen pointer when the wheel stops is the amount won.

One of ordinary skill will readily see that my invention is useful with any of the above-mentioned methods of displaying award amounts on a wheel. For example multiple pointers can be active simultaneously and the award indicated when the wheel and pointers come to rest are the amounts won. The player may win the highest value indicated by the plurality of pointers, or the player is paid the sum of all values indicated by all active pointers.

As an alternative to mechanical wheels or video depictions of wheels, the image of a segmented wheel can be backlit with one illuminator for each wheel segment. Such implementations are known in the art as light wheels. The illuminators are lit, one at a time, in sequence, to simulate rotation. Whichever segment is lit when the sequence comes to a halt is the amount won. These are but two of many other methods of illumination which can be utilized with my invention.

Wager Size Indicator

Turning again to FIG. 6, wager size indicator 650 is constructed of a number of illuminators arranged in the shape of an arrow on the right and left sides of wheel activation button 640. Each time a wager is made, these illuminators flash from the base of the arrow towards button 640. The brightness and duration of the flash is proportional to wager size. Gaming machine 600 is a three credit game, that is, players may wager one, two or three credits per game played. If three credits are wagered, illuminators 650 flash brighter and remain lit longer than if two credits are wagered. And a two credit wager causes an illumination flash that is brighter and longer-lasting that a single credit wager.

One of skill in the art understands that the shape in which the illuminators are arranged, the quantity of illuminators used and the color and brightness with which they indicate wager size and nearness to a mystery win can be varied according to need, so long as it is demonstrated to players that larger wagers are more likely to win a mystery bonus award than smaller wagers. Alternatively, in FIG. 6, audio cues (not shown) may be used to supplement or replace visual indicators.

Alternative Bonus Displays

Figure 7:
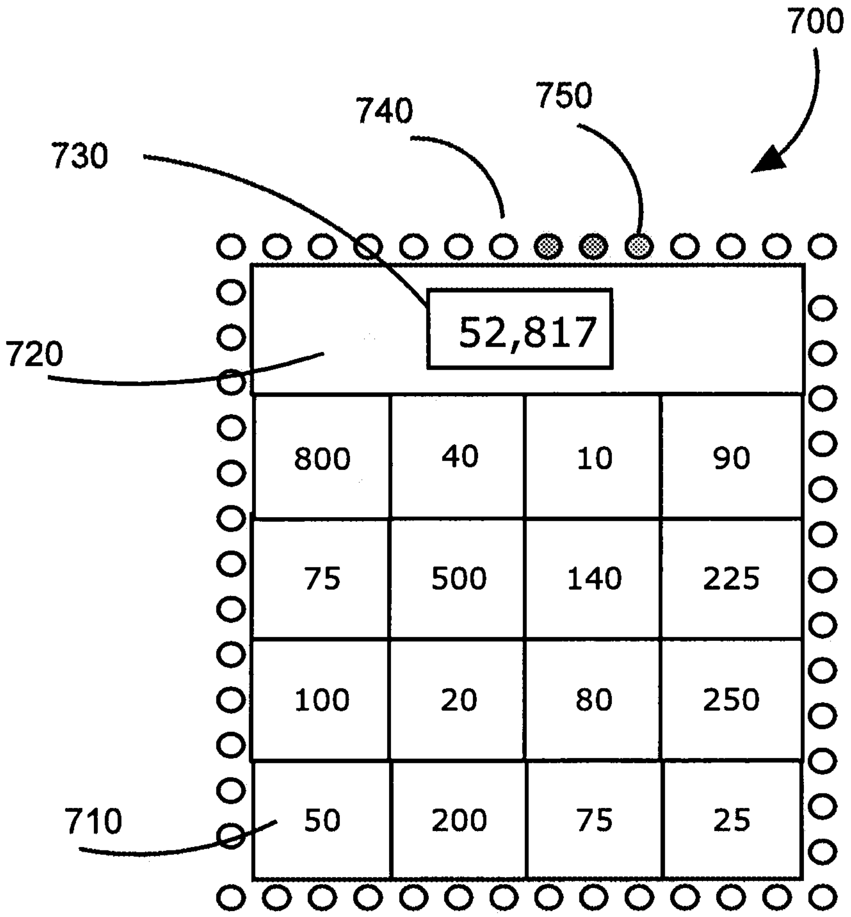
FIG. 7 illustrates a 16-level fixed-award mystery award with an additional progressive mystery award which includes illuminators to indicate proximity to next award occurrence according to my invention.

FIG. 7 depicts an alternate display configuration embodiment of my invention. Overhead display 700 contains sixteen separate fixed mystery award indicators 710 and one mystery progressive award indicator 720 which surround progressive award display 730. Each of the sixteen fixed mystery award indicators 710 and the one mystery progressive indicator 720 is backlit by an illuminator and each is associated with its own randomly selected winning number W and counter which is incremented as a function of credits wagered. Until one of the seventeen mystery awards is won, all of the illuminators behind the seventeen award indicators are turned off.

The set of award displays is surrounded by a win proximity indicator implemented as individual illuminators 740. At initiation, all illuminators 740 are off. As play ensues and a win on any of the seventeen awards grows closer, illuminators 740 are lit one at a time, starting at the first illuminator located clockwise of the 12 o'clock position. In the embodiment depicted in FIG. 7, the first three illuminators 750 are lit. Because each counter and each associated lucky number W is known within the system, it is straightforward to calculate how many wagers remain before a win occurs.

As any win grows closer, a proportionate number of illuminators 740 are lit in clockwise sequence. The illumination sequence is conducted so that the very last illuminator 740, which is at the 12 O'clock position, is lit when a win occurs. At this time all illuminators 740 are lit, completely encircling the array of seventeen award displays. When this happens, the illuminators behind each award display 710 and 720 are lit, one at a time. After one of the award displays is lit for a brief time, it extinguishes, and another of the award illuminators 710 or 720 is lit. Each illuminator is lit in a pattern so that all illuminators are lit once in each sequence which then repeats. Over the period of a few seconds, the sequencing speed slows until only the award display that was won remains illuminated and that amount is awarded to the winning player.

Means of Implementation

Figure 8:
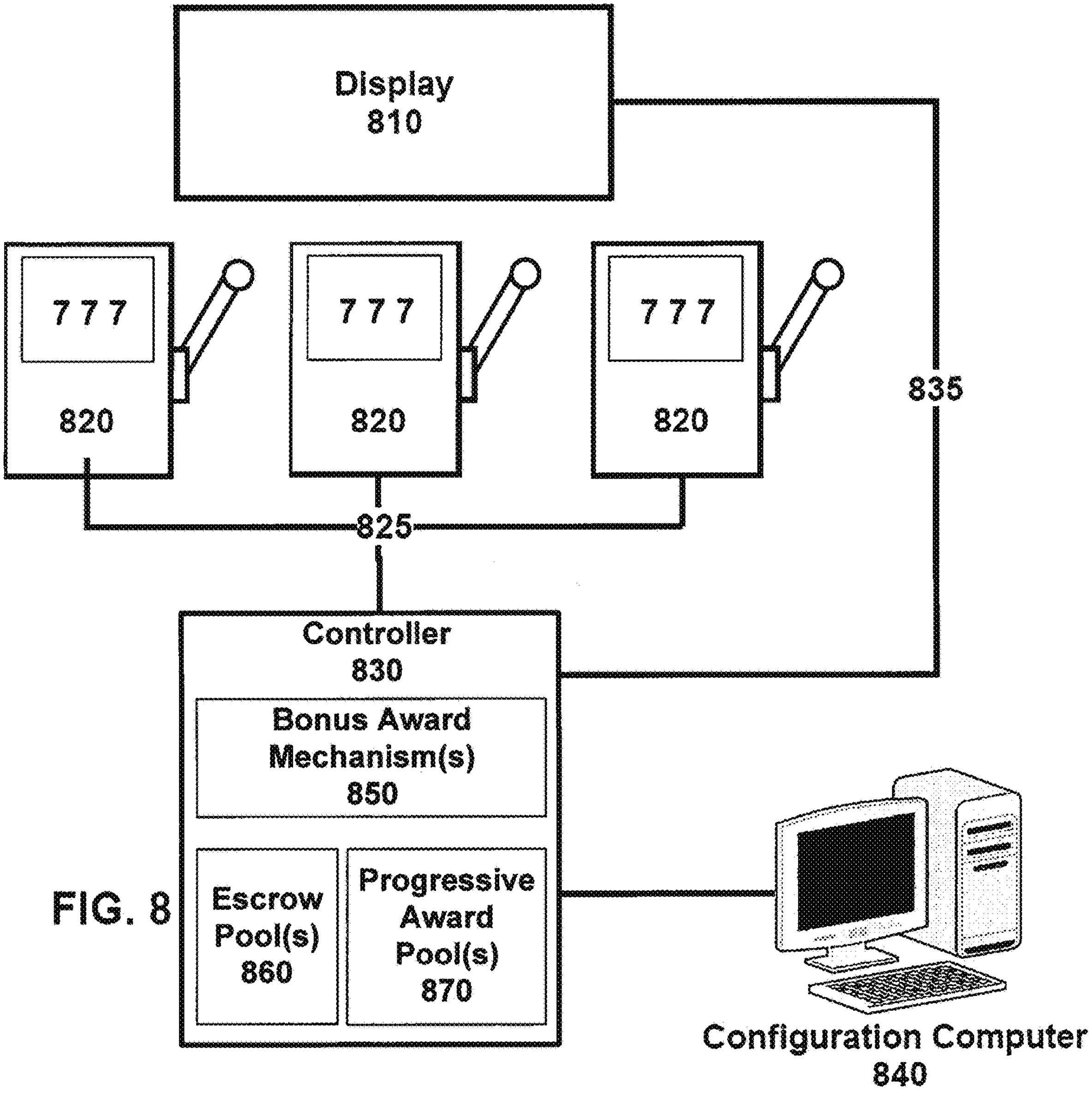
FIG. 8 is a schematic diagram of gaming machines and display device connected to a mystery award controller according to my invention.

Referring now to FIGS. 8, 8*a*, 8*b*, 8*c*, 8*d*, 8*e*, 9, and 10, I now describe various means of configuring my invention. FIG. 8 depicts a schematic representation of a linked implementation of my invention. Controller 830 is configured by means of configuration computer 840 with the number of mystery awards, the size of each, the rate of increment for each wager, and the range from which winning numbers are to be randomly selected, amongst other parameters. Controller 830 may also comprise one or more bonus award mechanisms 850, one or more progressive award pools 870, and one or more escrow pools 860, the operation of which is described in additional detail below. One of skill in the art will recognize that configuration techniques for mystery award controllers are well known and all such configuration means may be used with this invention.

Three gaming machines 820 are shown, though any number may be used, including a single machine. Each is connected to controller 830 through connection 825. In a preferred embodiment, this connection is a two-way serial protocol capable of allowing the controller 830 to receive information about game play, including wagers made from each gaming machine and also to send payout messages to each gaming machine for payment when a mystery award is won on that gaming machine. Examples of such two-way protocols include the well-known existing industry standard SAS protocol and the industry standard protocol in development by the Gaming Standards Association.

In yet another embodiment, connection 825 is a one-way transfer of information from each gaming machine 820 to controller 830. Such connections are less preferable because automated award payments are not supported.

Gaming machine designs sometimes utilize Ethernet, USB or other such high-speed network connections which offer the advantage of high-bandwidth and are useful for carrying information for many purposes from gaming machines to many kinds of controllers and database systems. These connections are being adapted for other casino functions such as player tracking, casino accounting and security. One of skill in the art will appreciate that such high-bandwidth connections are useful with my invention whether they are used exclusively for the purpose of transferring mystery award information or if the connection serves a variety of other purposes as well.

Connection 825 may also be implemented via wireless protocol such as Bluetooth, Zigbee, wireless Ethernet or other protocol whether based on radio frequency (RF), infrared or other technologies.

Connection 835 transfers information between controller 830 and display 810. This connection may be of a wide range of electrical protocols such as RS-232 or it may utilize more recent protocols that specify electrical, connector, cabling and information communication structure such as Ethernet or USB. One of skill in the art will appreciate that a wide variety of standard and proprietary connector, cable, electrical and information structure protocols may be used with this invention, including wireless protocols.

The transfer protocol for connection 835 may be one-way from controller 830 to display 810, or more preferably, two-way, with information flowing from controller 830 to display 810 and from display 810 to controller 830.

Although a single display is shown, multiple displays may be used and the displays may be mounted over or near a bank of gaming machines, on individual gaming machines or as remote displays away from the gaming machines to which they are associated.

Once controller 830 is configured and connected, wagering information from each gaming machine 820 is transmitted to the controller via connection 825 where it is used to increment the counter(s) which are then compared against the list of Winning values W. If the configuration includes progressive mystery awards, the updated award values are transmitted to the display 810 via connection 835 for presentation to players. Information for winner identification, win proximity, wager size and win occurrence are also sent from controller 830 to display 810.

When connection 835 allows two-way communication, display 810 returns information back to controller 830, including acknowledgement that each message sent from the controller was received, diagnostic information that the display is functioning properly and other such housekeeping and award information.

Display 810 may be a video display and preferably includes a processor for rendering the required images and updating the image with information received from controller 830. Any type of video display is useful including LCD, Plasma, rear-projection DLP, CRT, LED, VFD or any other technology capable of rendering the desired image for presenting information to players about award values, win occurrences, wager sizes, win proximity, etc.

Figure 8A:
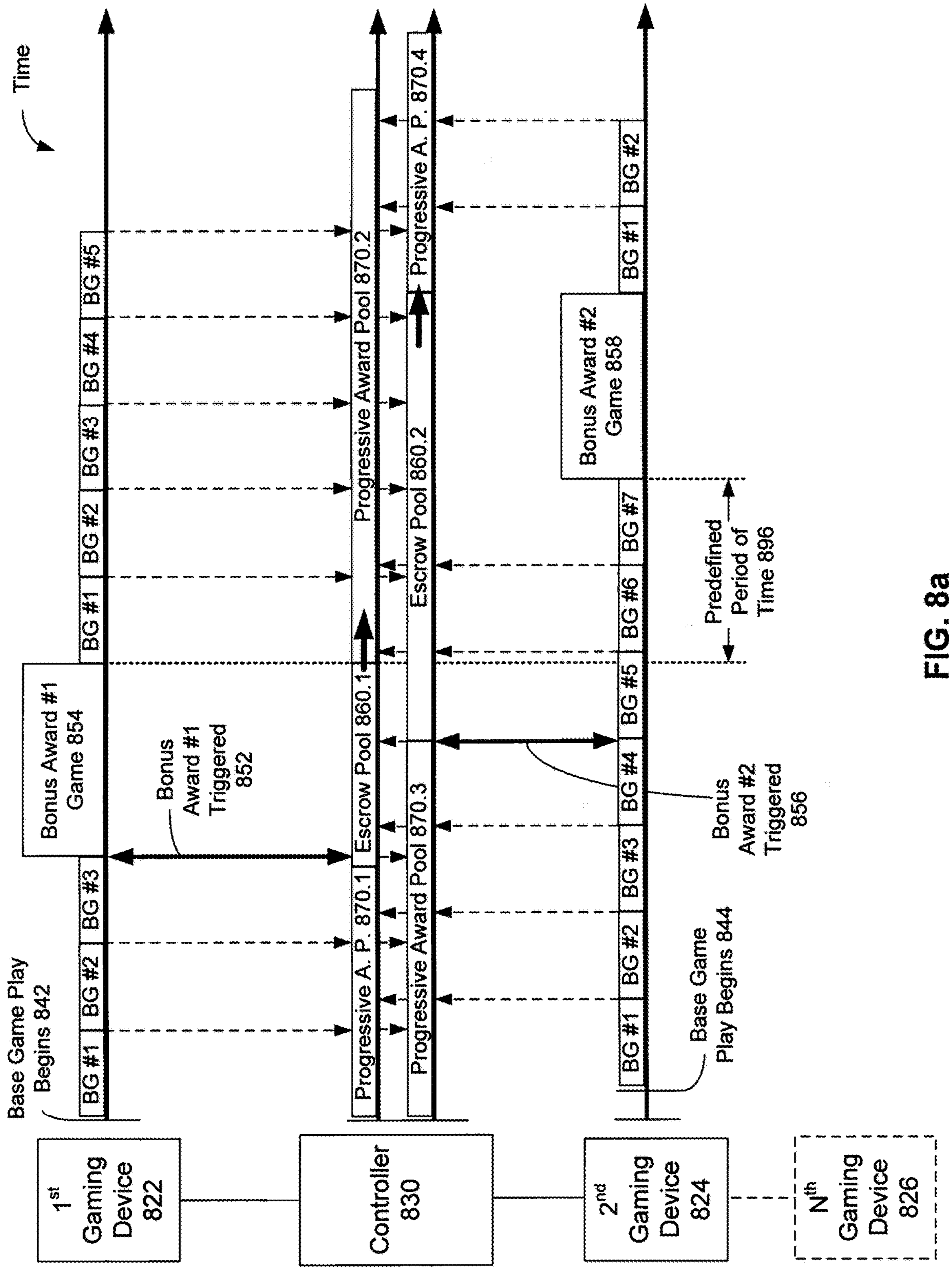
FIG. 8*a* illustrates a timing diagram of a linked implementation of my invention according to one embodiment.

FIG. 8*a* depicts a timing diagram of a linked implementation of my invention according to one embodiment.

The controller 830 may be operatively coupled to 1$^{st}$ gaming device 822, 2$^{nd}$ gaming device 824, and other gaming devices such as the Nth gaming device 826. The controller 830 may be configured to track progressive award pools such as 870.1 and 870.3, which may be periodically updated according to base game outcomes, payback percentages, or other conditions, as indicated by the dotted arrow lines extending from each base game to each of the progressive award pools. Each progressive award pool such as 870.1 and 870.3 may include one or more counters (such as counter C as previously discussed with reference to FIGS. 3*a*-3*e*). Base game play for the 1$^{st}$ gaming device begins at 842 and base game play for the 2$^{nd}$ gaming device 824 begins at 844.

A bonus award #1 associated with progressive award pool 870.1 may be triggered at 852, which may then cause secondary game or bonus award game 854 associated with bonus award #1 to be played. At about the time of the bonus award being triggered at 852, an escrow pool 860.1 may be formed and configured to store information about base game outcomes, payback percentages, or other conditions received from the base games or gaming devices themselves, and may increment a stored counter in response to any of the information. The escrow pool 860.1 may record all additional play that would count toward a new trigger event. Such information can be stored even while the bonus award game 854 associated with the bonus award #1 is still being played. As such, other trigger events can occur even while the bonus award game 854 is still being played.

For example, bonus award #2 associated with progressive award pool 870.3 may be triggered at 856 while the bonus award game 854 associated with bonus award #1 is still being played. In this embodiment, escrow pool 860.2 may be formed at about the time of the bonus award #2 being triggered at 856. However, in this case, the bonus award #2 associated with bonus award game 858 may not be awarded or played immediately. Instead, the bonus award #2 associated with bonus award game 858 may be awarded or played a predefined period of time 896 after the ending of the bonus award game 854 associated with the bonus award #1. This can be done to ensure someone is still playing the game and has not walked away from the gaming device, as it is desirable to not award payments to an unused game.

The escrow pool 860.1 may continue to store information about base game outcomes, payback percentages, or other conditions, and increment the stored counter until about the ending of the bonus award game 854 associated with the bonus award #1, after which the information, including the stored counter value, may be transferred to progressive award pool 870.2. In other words, all play that was escrowed would then be applied to the next bonus round associated with progressive award pool 870.2. Similarly, escrow pool 860.2 may continue to store information about base game outcomes, payback percentages, or other conditions, and increment a stored counter until about the ending of the bonus award game 858 associated with the bonus award #2, after which the information, including the stored counter value, may be transferred to progressive award pool 870.4. Thereafter, regular base game play ensues until the next bonus award triggering event.

In larger or busier installations of gaming devices involving many gaming device links, many levels of bonus award wins may be nested simultaneously. Each bonus award win can be processed in an order specified by the game designer, the casino operator, or another interested party. There may be additional requirements such as a defined period of time amount of play, or play results, or other such parameters, in combination or alone, which can be used to disperse bonus awards over a longer period of time. One of skill in the art will recognize that there are many possible ways to choose a winner. The one or more bonus award mechanisms 850 (of FIG. 8) may award any of the bonus awards.

Figure 8B:
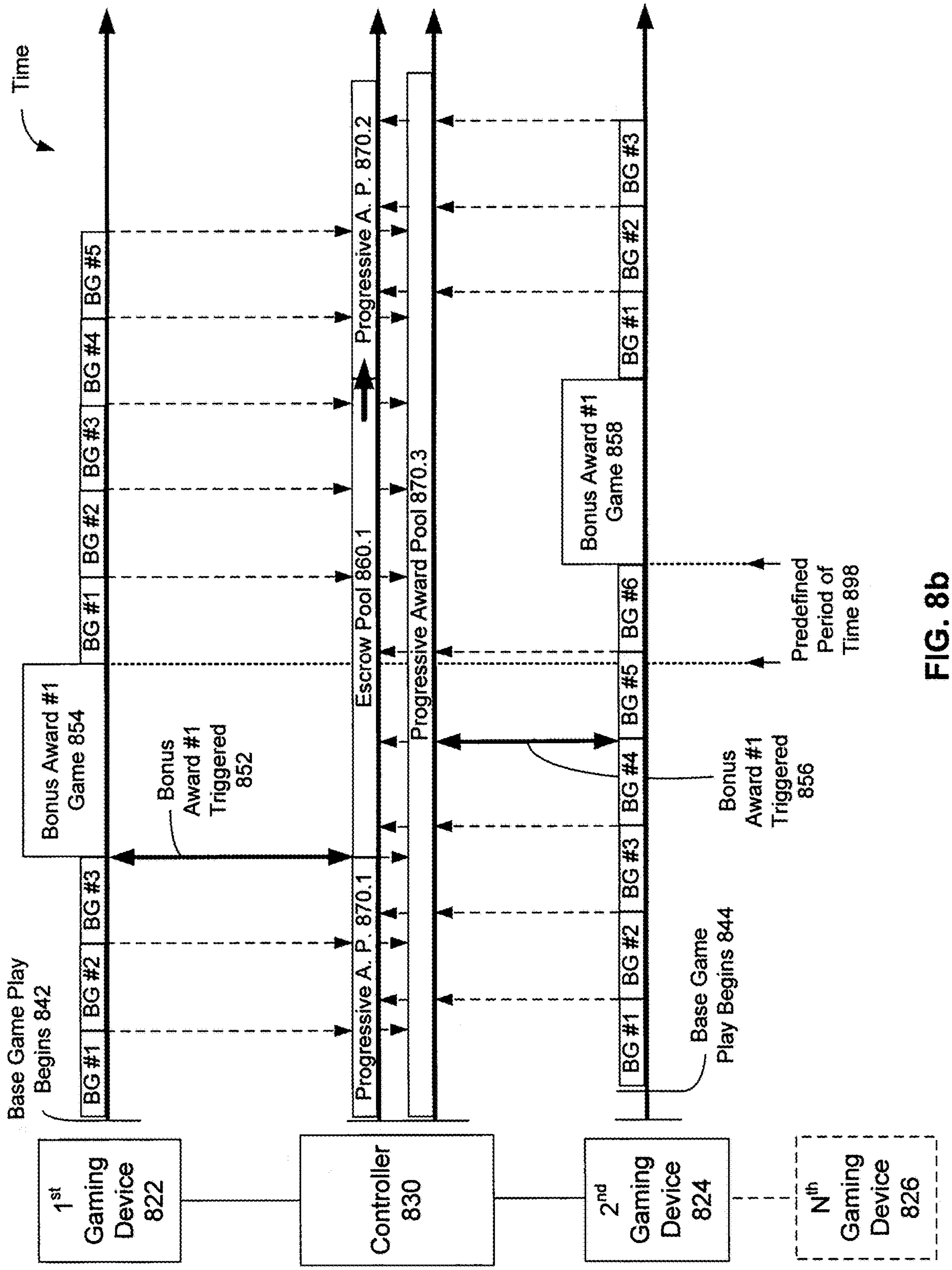
FIG. 8*b* illustrates another timing diagram of a linked implementation of my invention according to another embodiment.

FIG. 8*b* depicts another timing diagram of a linked implementation of my invention according to another embodiment.

This embodiment is similar to that shown with reference to FIG. 8*a*; however, instead of a bonus award #2 being triggered at 856 as shown in FIG. 8*a*, the bonus award #1 is triggered again at 856 while the bonus award game 854 associated with the bonus award #1 is still being played. This can occur because the bonus award #1 can be triggered based on a variety of information such as base game outcomes or other conditions from other gaming devices such as the 2$^{nd}$ gaming device 824 or the Nth gaming device 826, any of which can trigger the same or different bonus awards.

A bonus award game 858 associated with the bonus award #1 may be played after a predefined period of time 898 from the ending of the bonus award game 854, which is also associated with the bonus award #1. This can be done to ensure someone is still playing the game and has not walked away from the gaming device, as it is desirable to not award payments to an unused game. In this case, the escrow pool 860.1 continues until the ending of the bonus award game 858 associated with the bonus award #1, after which the information, including the stored counter value, may be transferred to progressive award pool 870.2. Since the progressive award pool 870.3 did not have a bonus award triggered, the progressive award pool 870.3 may proceed without the formation of an escrow pool. The one or more bonus award mechanisms 850 (of FIG. 8) may award any of the bonus awards.

Figure 8C:
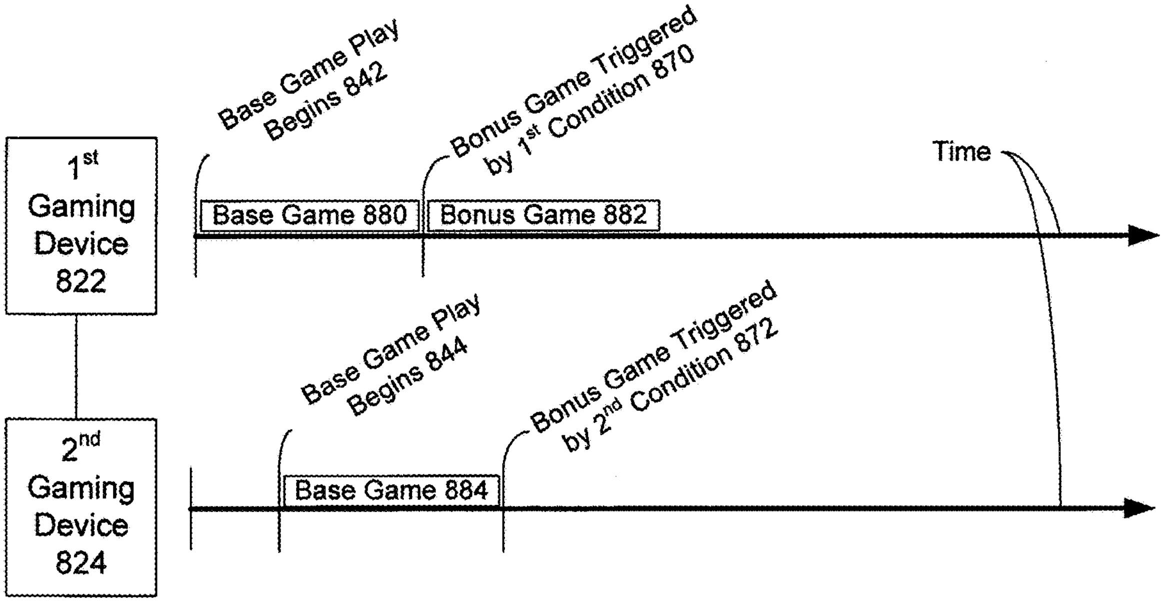
FIG. 8*c* illustrates a simplified timing diagram of a linked implementation of my invention according to one aspect of FIG. 8*a*.

FIG. 8*c* depicts a simplified timing diagram of a linked implementation of my invention according to one aspect of FIG. 8*a*.

In this embodiment, base game play may begin at 842 for the 1$^{st}$ gaming device 822 and base game play may begin at 844 for the 2$^{nd}$ gaming device 824. A bonus game 882 may be triggered by a 1$^{st}$ condition 870. While the bonus game 882 is being played, another bonus game may be triggered by a 2$^{nd}$ condition 872. In other words, the one or more bonus award mechanisms 850 (of FIG. 8) may award a bonus game 882 to the base game 880 associated with gaming device 822, and while the bonus game 882 is being played, another bonus game may be triggered by a 2$^{nd}$ condition 872 different from the 1$^{st}$ condition 870. The 2$^{nd}$ condition 872 may be associated with the base game 884 played on the 2$^{nd}$ gaming device 824, or may be associated with some other condition associated with either the 1$^{st}$ gaming device 822 or the 2$^{nd}$ gaming device 824. The one or more bonus award mechanisms 850 (of FIG. 8) may award any of the bonus awards.

Figure 8D:
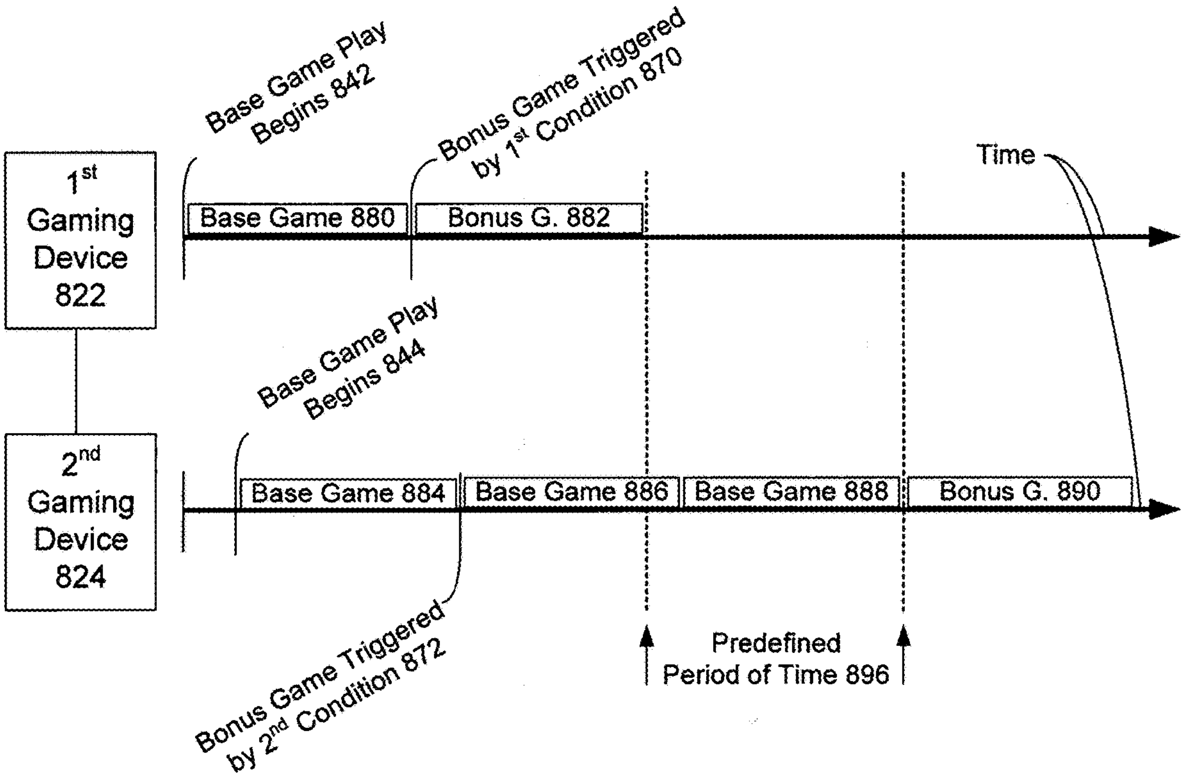
FIG. 8*d* illustrates another simplified timing diagram of a linked implementation of my invention according to one aspect of FIG. 8*a*.

FIG. 8*d* depicts another simplified timing diagram of a linked implementation of my invention according to one aspect of FIG. 8*a*.

The elements of FIG. 8*d* are similar to those of FIG. 8*c*. In addition, FIG. 8*d* shows additional base games 886 and 888 that are played on the $2^{nd}$ gaming device 824 after the bonus game is triggered by the $2^{nd}$ condition 872. The bonus game 890 associated with the $2^{nd}$ gaming device 824 may not be played until after a predefined period of time 896 from the ending of the bonus game 882 associated with the $1^{st}$ gaming device 822, even though the bonus game 890 was previously triggered by the $2^{nd}$ condition 872. This can be done to ensure someone is still playing the game and has not walked away from the gaming device, as it is desirable to not award payments to an unused game.

Other embodiments are possible. For example, a bonus award (and associated secondary or bonus game) may be awarded to a base game different from a base game that actually triggers the bonus award. As another example, the one or more bonus award mechanisms 850 (of FIG. 8) may prevent all bonus awards from being awarded even though all of the conditions for winning a bonus award are met. Moreover, the one or more bonus award mechanisms 850 may be configured to award one bonus award at a time, or to ensure that only one bonus game at a time is played. Further, the one or more bonus award mechanisms 850 may be configured to randomly award the bonus award to one of the base games associated with any of the gaming devices. Alternatively, the one or more bonus award mechanisms 850 may be configured to select an Nth gaming device that plays a base game after a completion of a first bonus award, to receive the next bonus award. When referring to an Nth gaming device, it should be understood that N can be any positive integer.

Figure 8E:
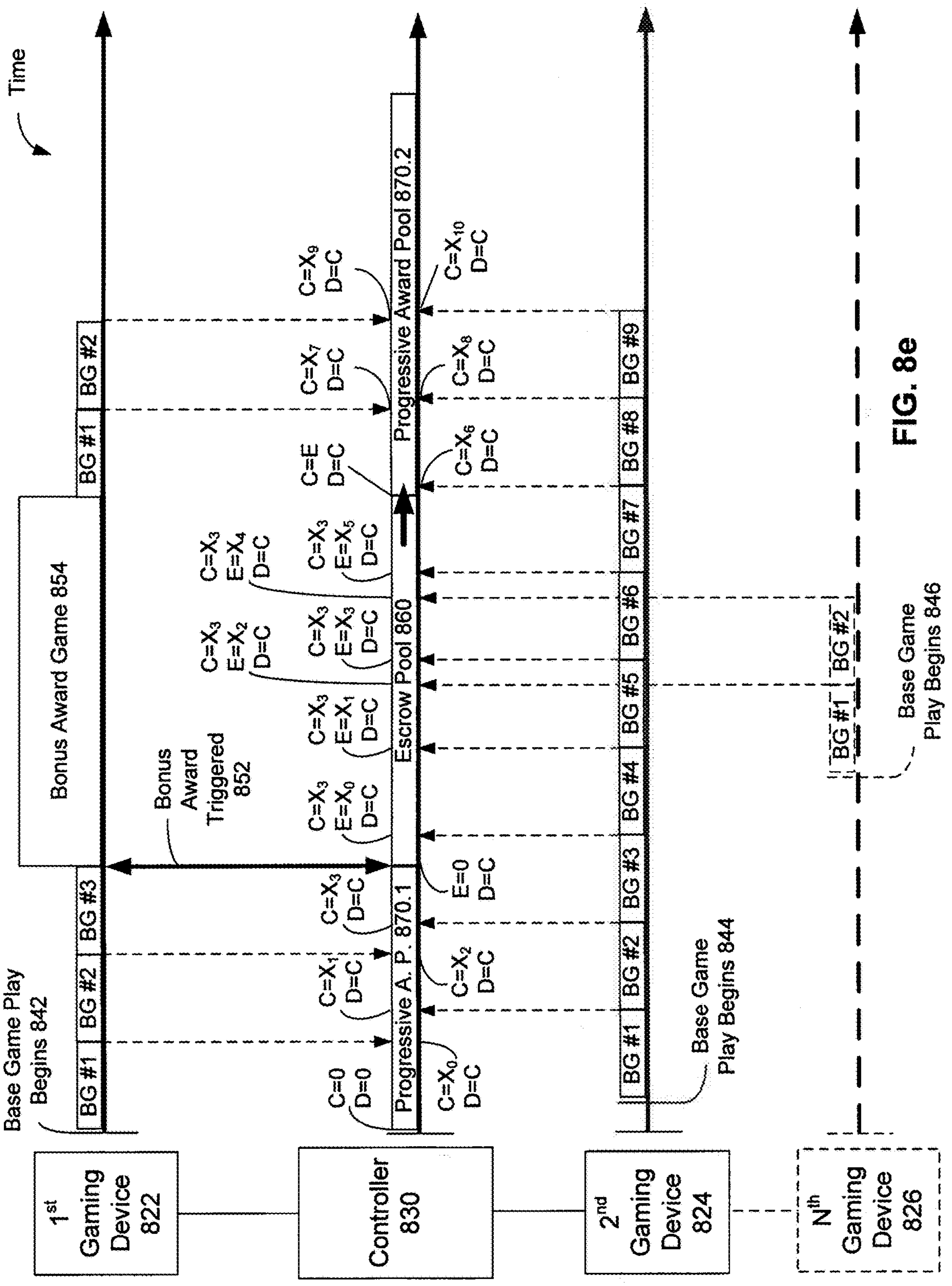
FIG. 8*e* illustrates a timing diagram of a linked implementation of my invention according to yet another embodiment.

FIG. 8*e* depicts a timing diagram of a linked implementation of my invention according to yet another embodiment.

The controller 830 may be operatively coupled to $1^{st}$ gaming device 822, $2^{nd}$ gaming device 824, and other gaming devices such as the Nth gaming device 826. The controller 830 may be configured to track progressive award pools such as 870.1 and 870.2, which may be periodically updated according to base game outcomes, payback percentages, or other conditions, as indicated by the dotted arrow lines extending from each base game to each of the progressive award pools. Each progressive award pool such as 870.1 and 870.3 may include one or more counters (such as counter C as previously discussed with reference to FIGS. 3*a*-3*e*). Base game play for the $1^{st}$ gaming device begins at 842, base game play for the $2^{nd}$ gaming device 824 begins at 844, and base game play for the Nth gaming device 826 begins at 846.

A bonus award associated with progressive award pool 870.1 may be triggered at 852, which may then cause bonus award game 854 to be played. At about the time of the bonus award being triggered at 852, an escrow pool 860 may be formed and configured to store information about base game outcomes, payback percentages, or other conditions received from the base games or gaming devices themselves, and may increment a stored counter in response to any of the information. The escrow pool 860 may record all additional play that would count toward a new trigger event. Such information can be stored even while the bonus award game 854 is still being played.

In this embodiment, a counter C associated with the progressive award pools 870.1 and 870.2 represents progress toward a triggering event, such as the bonus award that is triggered at 852. The value D represents a value displayed to users of the gaming devices. For example, D could correspond to the win proximity indicator as previously discussed. The value E represents an escrow counter that records all additional play that would count toward a new triggering event. As shown in FIG. 8*e*, C and D may be initialized to zero at about the time base game play begins at 842.

Thereafter, C may be progressively incremented to the values of $X_0$, $X_1$, $X_2$, etc. until the bonus award is triggered at 852. At this time, C can maintain the value $X_3$ while the bonus award game 854 is played. In the meanwhile, D can display the value of C, even while E begins to accumulate the additional play that would count toward the new triggering event. In this manner, the display associated with the amount won can be frozen for all bystanders to see and celebrate, even while the escrow counter E continues to accumulate and record additional base game play from other gaming devices such as the $2^{nd}$ gaming device 824 and the Nth gaming device 826.

After the bonus award game 854 is completed, the counter C may be set to the value stored in the escrow counter E, and the counter C may continue to track progress toward the next triggering event associated with the progressive award pool 870.2. Persons having skill in the art will recognize that other arrangements of counters can be used. For example, rather than have a separate escrow counter E, the counter C may continue to track base game play during the bonus award game 854 while a separate value is displayed or frozen for the bystanders to see and celebrate during play of the bonus award game 854.

Figure 9:
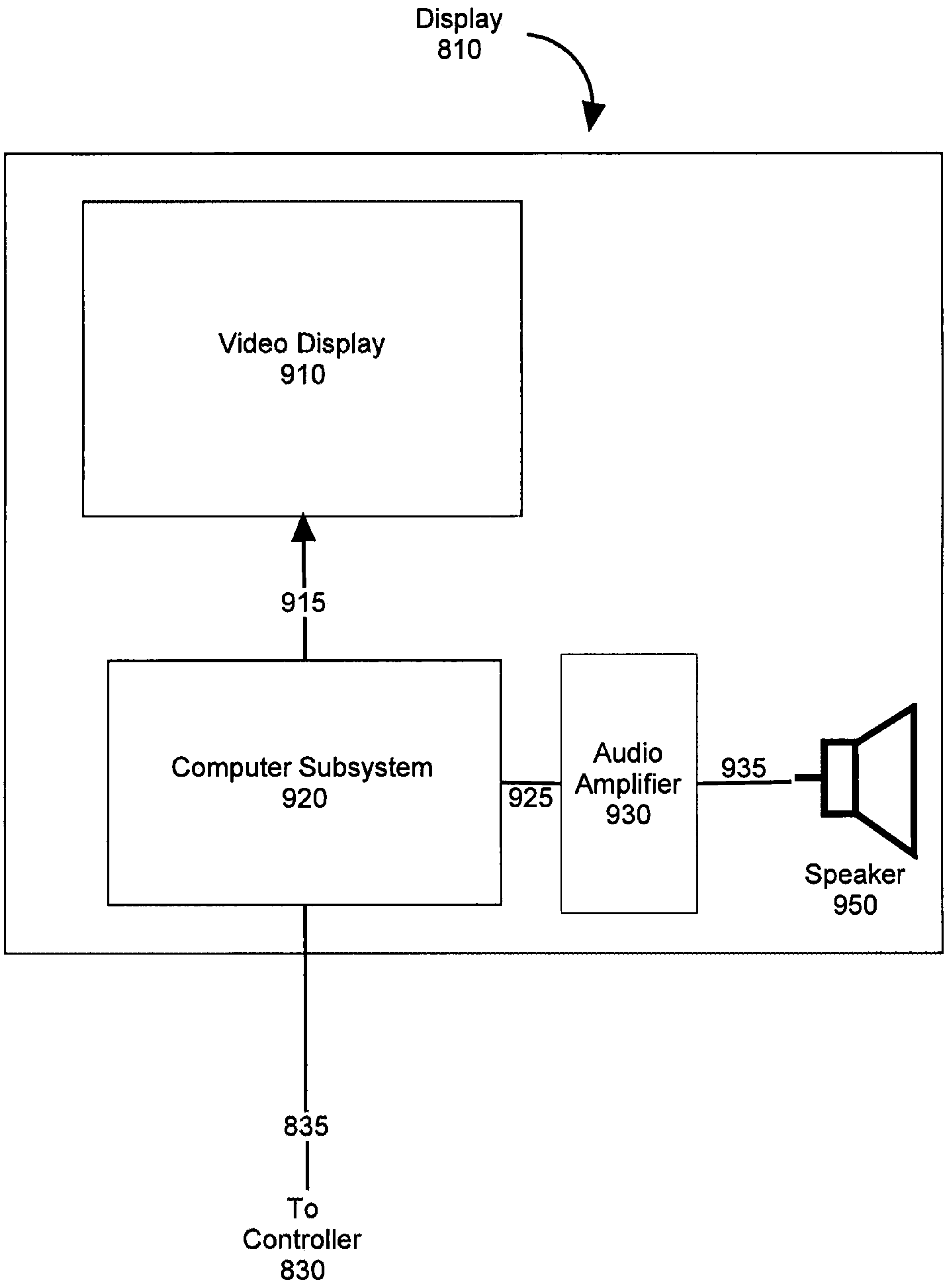
FIG. 9 is a schematic diagram of a video subsystem used as a display device according to my invention.

FIG. 9 illustrates video display 910 connected to computer subsystem 920 via connection 915. The video display 910 is preferably a flat panel display using LCD or plasma technology as such displays are economical, widely available, long-lived and require little physical space. Of course, any other video display technology may be used.

The computer subsystem 920 is preferably a personal computer running Microsoft Windows, Linux, or Apple's OS X, though other operating systems may be desirable in certain situations. The computer subsystem may render the image using Macromedia's FLASH programming methodology or it may use alternative application software for rendering. As virtually all computers do, computer subsystem 820 includes a case, power supply, main processor such as an Intel Pentium, a graphics coprocessor, or separate processing card such as an ASUS EN7600GT video interface for driving the video display, standard memory such as DRAM, non-volatile memory such as a hard disk and/or CD_ROM, DVD player, flash memory, battery backed RAM or some combination therein. The operating system, applications programs and data are stored in non-volatile memory and loaded into processor memory, usually DRAM, as needed. All such computer components, and other associated components that may be optionally used, are well known to those of skill in the art and will not be further described here.

The connection 915 between computer subsystem 920 and video display 910 may be, but not limited to, VGA, DVI, HDMI, component video, or less-preferably S-video or composite video.

Another benefit of using a personal computer for video rendering is that most such computers include powerful capabilities for creating and storing audio waveforms. Connection 925 takes the output from computer subsystem 820 audio output to an audio amplifier 930. Connection 925 may be analog or digital audio signals such as optical TOSLINK or coaxial SPDIF, or other such cable for carrying monophonic, stereo, or surround sound information.

Audio amplifier 930 may be analog amplification sufficient to drive the chosen speaker or speakers 950. For example, the audio amplifier could be a two channel 50 watts RMS per channel amplifier as is readily available from many well-known sources. Alternately, the audio amplifier 930 could contain an audio processor for processing surround sound information from either the analog inputs or from digital inputs.

Speaker 950 may be a single speaker or a pair of speakers for stereo sound. Alternately, speaker 950 could be a set of speakers to implement surround sound in 5 or 7 channels, or other configuration. Each speaker channel may include a simple single cone speaker or an array of speakers for desired sound dispersion and/or improved frequency response. Subwoofers could be included for enhanced low frequency response.

Computer subsystem 920 connects to controller 830 via connection 835. Personal computers today typically include RS232, Ethernet and USB ports with a range of optional wired or wireless ports on specially configured computers or by adding an interface card to the standard personal computer.

Figure 10:
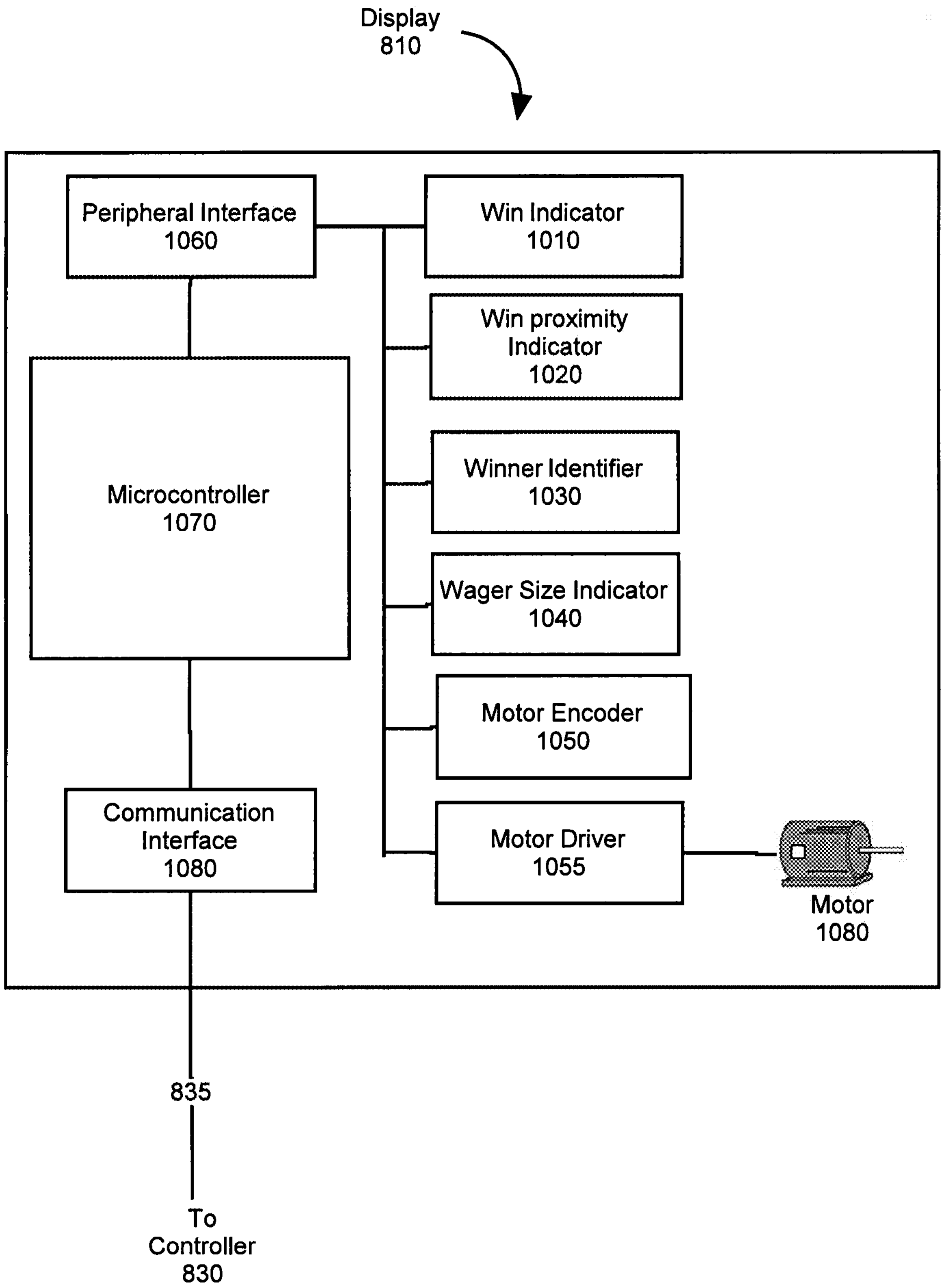
FIG. 10 is a schematic diagram of a motorized wheel, mystery award proximity indicator and wager size indicator used as a display device according to my invention.

FIG. 10 depicts a schematic representation of circuitry to enable a mechanical wheel display for use with controller 830 of FIG. 8. The video display of FIG. 9 is interchangeable in function with the mechanical wheel display of FIG. 10. One of skill in the art will recognize that these types of displays may be used together or separately and that many other types of displays are useful with my invention.

In FIG. 10, Microcontroller 1070 transmits and receives commands and information to and from controller 830 via communication interface 835. The microcomputer is connected to win indicator 1010, win proximity indicator 1020, winner identifier 1030, winner size Indicator 1040, motor encoder 1050 and motor driver 1055 through peripheral interface 1060.

Win indicator 1010, win proximity indicator 1020 and wager size indicator 1030 are typically arrangements of illuminators such as LEDs or light bulbs. These illuminators may be changed in brightness, color, pattern or a combination thereof as required to indicate the particular function and create excitement in a given environment. For example, the win proximity indicator could be shaped as thermometer 550 of FIG. 5 a crown of lights 620 surrounding wheel 630 as depicted in FIG. 6 or individual illuminators arranged as 740 in FIG. 7.

Motor 1080 has the wheel indicator connected to its shaft and may be a DC motor, an AC motor, a stepper motor or other type of motor as fits the size and weight of the wheel and the desired control in positioning and stopping the wheel. Motor driver 1055 is used to convert signals received from microcontroller 1070, via peripheral interface 1060 into a format and capacity for driving the motor. Motor encoder 1050 provides feedback on the motor position, allowing Microcontroller 1070 to sense exactly when to stop Motor 1080 so as to indicate the correct award on the wheel.

Motor controls and wheels are well-known to those of skill in the art. The same technology that is useful in controlling the wheels used in International Game Technology's "Wheel of Fortune®" and Bally Gaming's "Monte Carlo®" may be used in my invention.

The schematic depicted in FIG. 10 is readily adaptable to controlling a reel, which is simply a wheel turned on its side and with award values disposed on its circumference, much like a slot machine reel. A payline on the front of the reel housing indicates the winning mystery bonus amount, much like a payline on a slot machine indicates the paying symbols.

Controller 1030 may also be implemented using a personal computer or other suitable electronic control mechanism, a wide variety of which are well-known to those of skill in the art.

Figure 11:
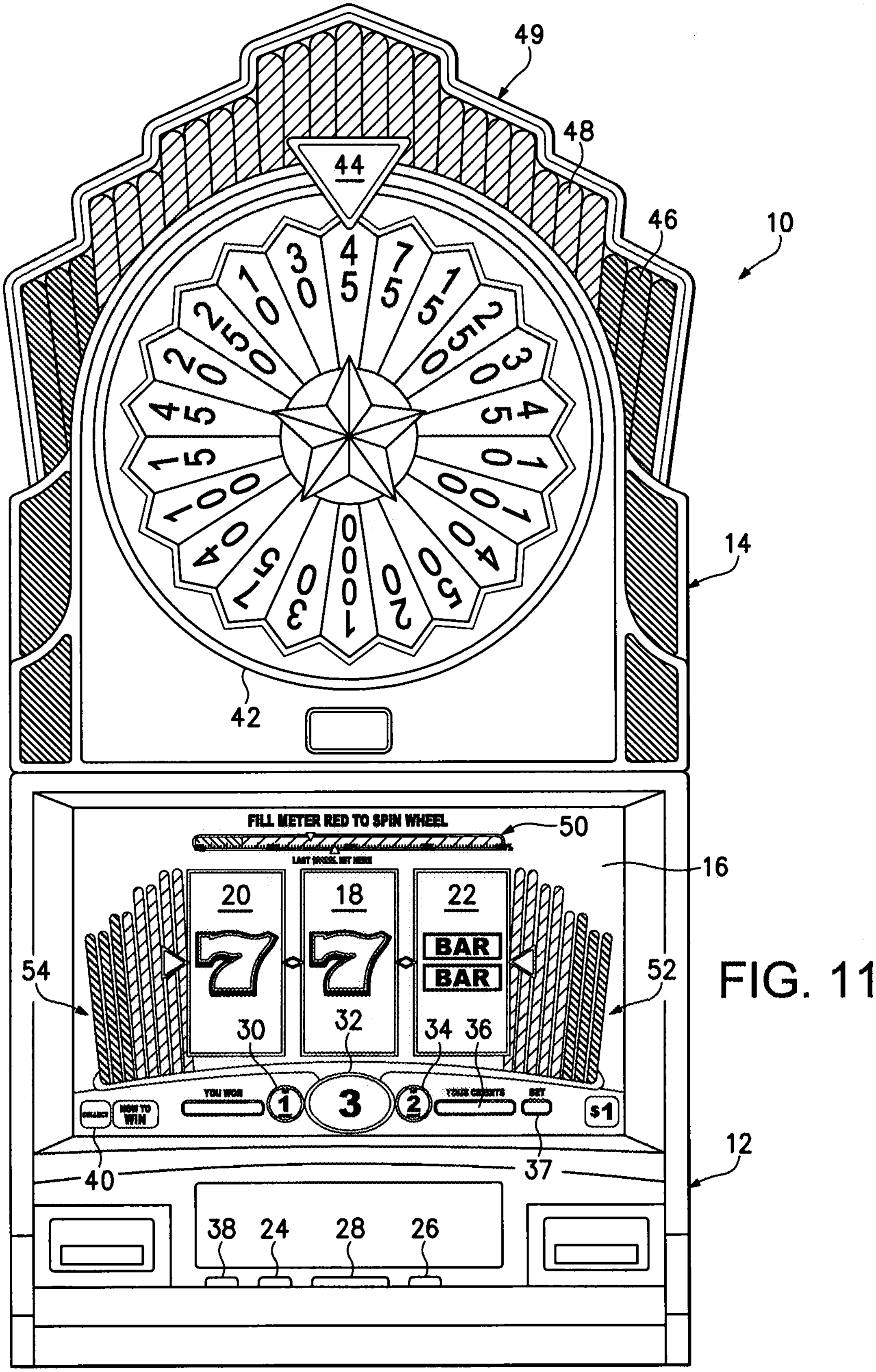
FIG. 11 is a front view of game similar to the one depicted in FIG. 6.

Turning now to FIG. 11, indicated generally at 10 is a gaming device constructed in accordance with the present invention. The gaming device includes a base game 12 and a secondary game 14. As with the embodiment of FIG. 6, gaming device 10 incorporates a Bally CineVision gaming machine. In gaming device 10, the Bally game comprises the base game.

The Bally game includes a display 16 that comprises an LCD screen. Display 16 displays information about the outcome of the video slot game played by base game 12 in the form of three video reel symbols 18, 20, 22. It also displays, on either side and above the reel symbols, information related to the secondary game, which will shortly be described more fully.

In the present embodiment, the base game accepts wagers of one, two, or three credits. These are placed by pressing a corresponding one of buttons 24, 26, 28, respectively. Alternatively, or in addition, touch screen symbols 30, 32, 34, respectively, may be used to place a bet. Display 16 further includes a Your Credits display 36 for showing total credits on the machine, including credits applied by a player as well as credits won as a result of play. A Bet display 37 shows the amount bet on the current game. A cash-out button 38 permits a player to receive all of his or her credits on the machine at the conclusion of play. A corresponding Collect image 40 can be provided to facilitate the same function, either alternatively or in addition to button 38.

Secondary game 14 includes a rotatable mechanical wheel 42, although it should be appreciated that other types of indicators, including lighted simulations of wheels and other indications, could be equally well used. When the secondary game is enabled and played, wheel 42 rotates about an axis in the center of the wheel. A pointer 44 points to one of the awards in the segments of wheel 42 when it comes to a stop thus indicating the amount the award in the secondary game. As with the other embodiment the opportunity to play the secondary game is a mystery award that may or may not be tied to the outcome of the base game.

Gaming device 10 indicates in several ways how close the player is to being eligible to play the secondary game, i.e., how close the mystery bonus is. First, illuminated polymer rods, like rods 46, 48, span the top of the gaming device above the wheel and form a semicircular lighting bank 49. In this view, rod 46 is colored red as are all other rods that are similarly designated with upper-left to lower-right cross hatching. Rod 48 is colored blue as are all other rods that are similarly designated with lower-left to upper-right cross hatching. As will be described in more detail, as the likelihood of playing the secondary game, i.e., the mystery bonus, becomes higher, the color of the rods progressively changes so that more become red as fewer remain blue.

The second way in which the player is informed about the proximity to the mystery bonus is a meter 50, which comprises an image on display 16 above the image of reel symbols 18, 20, 22. As will also be described in more detail, a left portion of the meter is red and a right is blue with the left portion progressively moving to the right thus making the meter more red and less blue as the mystery approaches.

The third way that the player is informed about progress toward the mystery bonus is by images of rods 52, 54, which flank either side of the reel images and which mirror the progression in color of the polymer rods on the top of gaming device 10. Rod images 52, 54 are also hatched in the same fashion as rods 46, 48 to indicate color.

Figure 12:
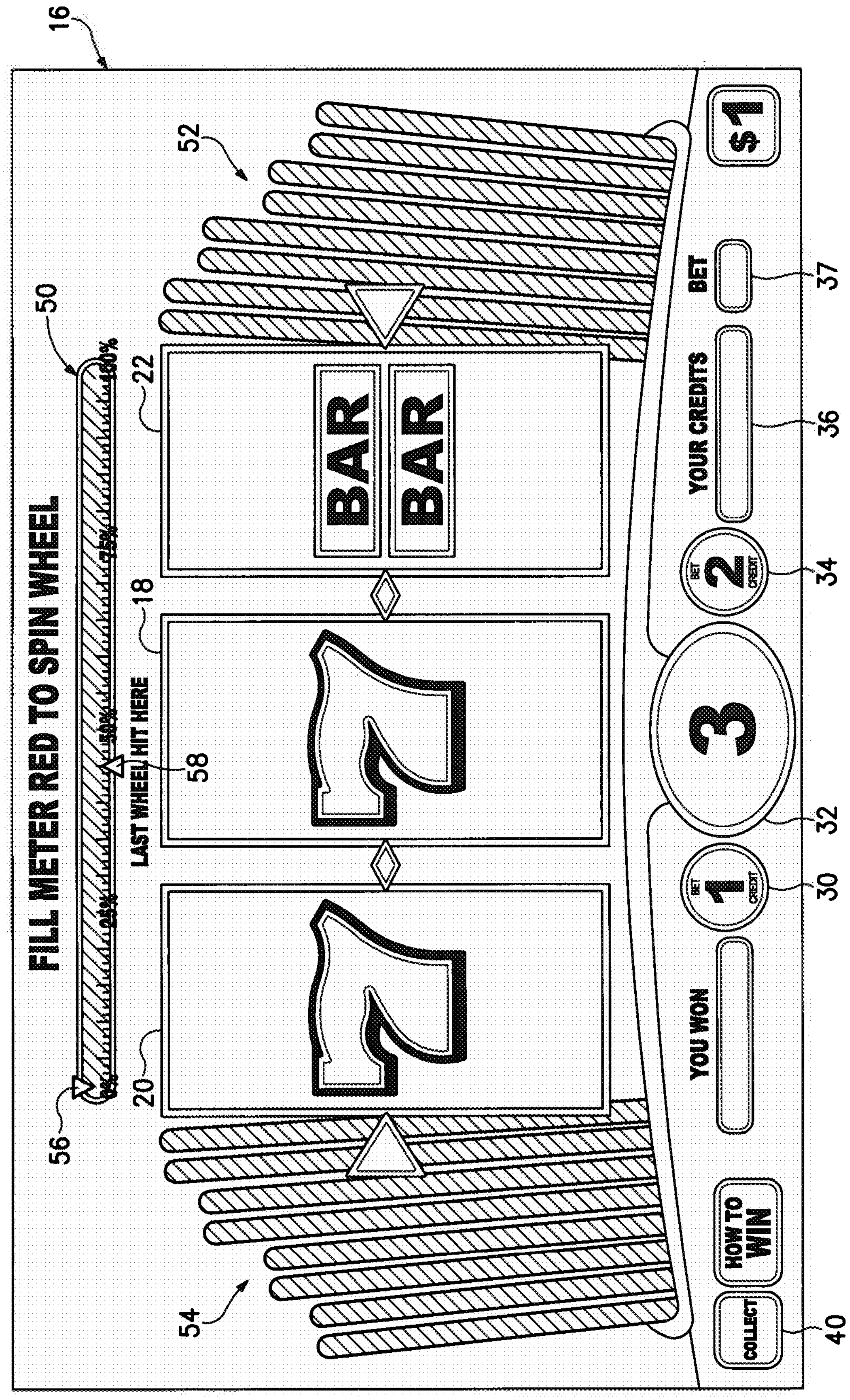
FIG. 12 is an enlarged view of a screen in the view of FIG. 11.

Consideration will now be given to play of the game from a player's perspective before description of the hardware and software to implement the game. Turning now to FIG. 12, display 16 is shown after a play of the bonus game. As a result, the meter 50 is illustrated as being all blue. It should be appreciated, however, that a mystery round is typically started at low end of a range defined by low and high numbers so that even after the secondary game has just been played, the red portion of the meter will indicate a starting point at zero, although the initial starting point could be above zero as well.

Meter 50 further includes pointer images 56, 58. Pointer 56 is aligned with the dividing line between the red and blue portions of the meter, thus indicating progress toward another secondary game. Pointer 58 points to the location on the meter when the last mystery was triggered. Additional pointers, like pointer 58, could be added to indicate the location on the meter when the mystery was triggered for the last two, three, or more secondary games.

Figure 13:
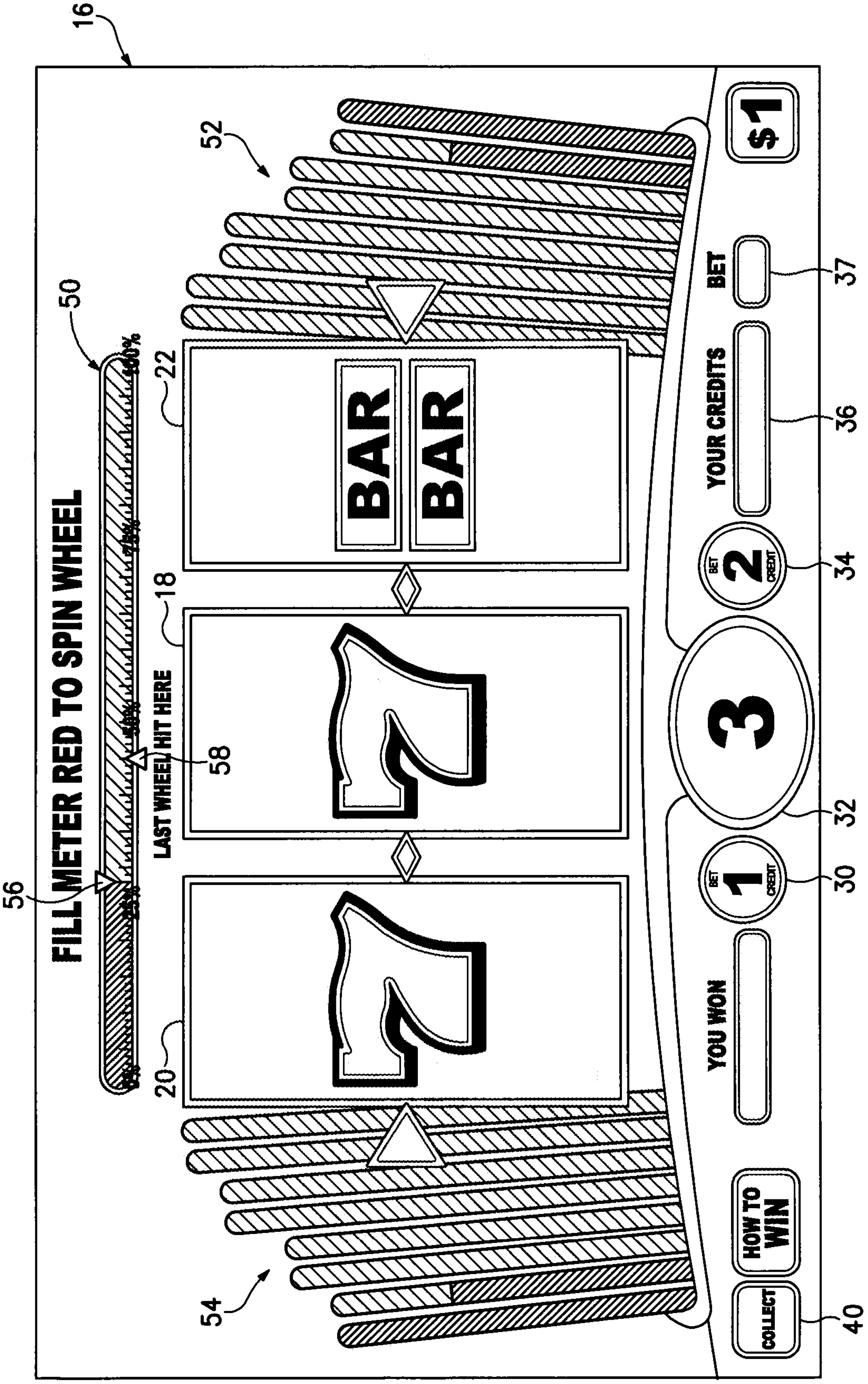
FIGS. 13-16 are views of the screen of FIG. 12 in different stages of game play.

Continuing to FIG. 13, multiple plays on base game 11 have occurred with pointer 56, as well as the red and blue images, indicating further progression toward the mystery bonus, i.e., play of the secondary game. As will be explained more fully in connection with a description of how the game is implemented, the progression of meter 58 as play continues may provide an indication of how close the machine is to providing the mystery award or it may indicate how close the machine is to the upper end of a range that contains a randomly selected trigger of the mystery award, preferably the latter.

Figure 14:
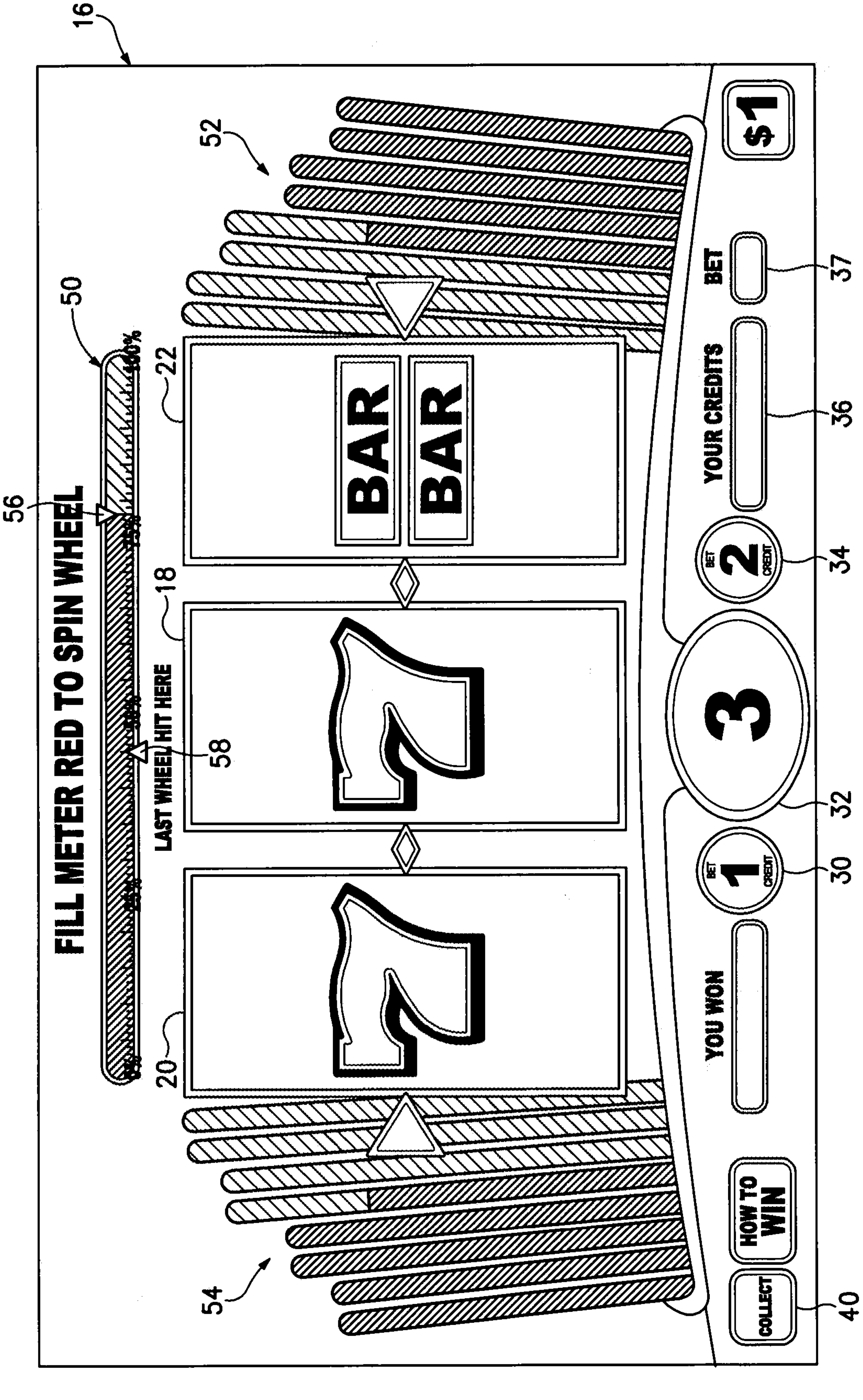
Figure 15:
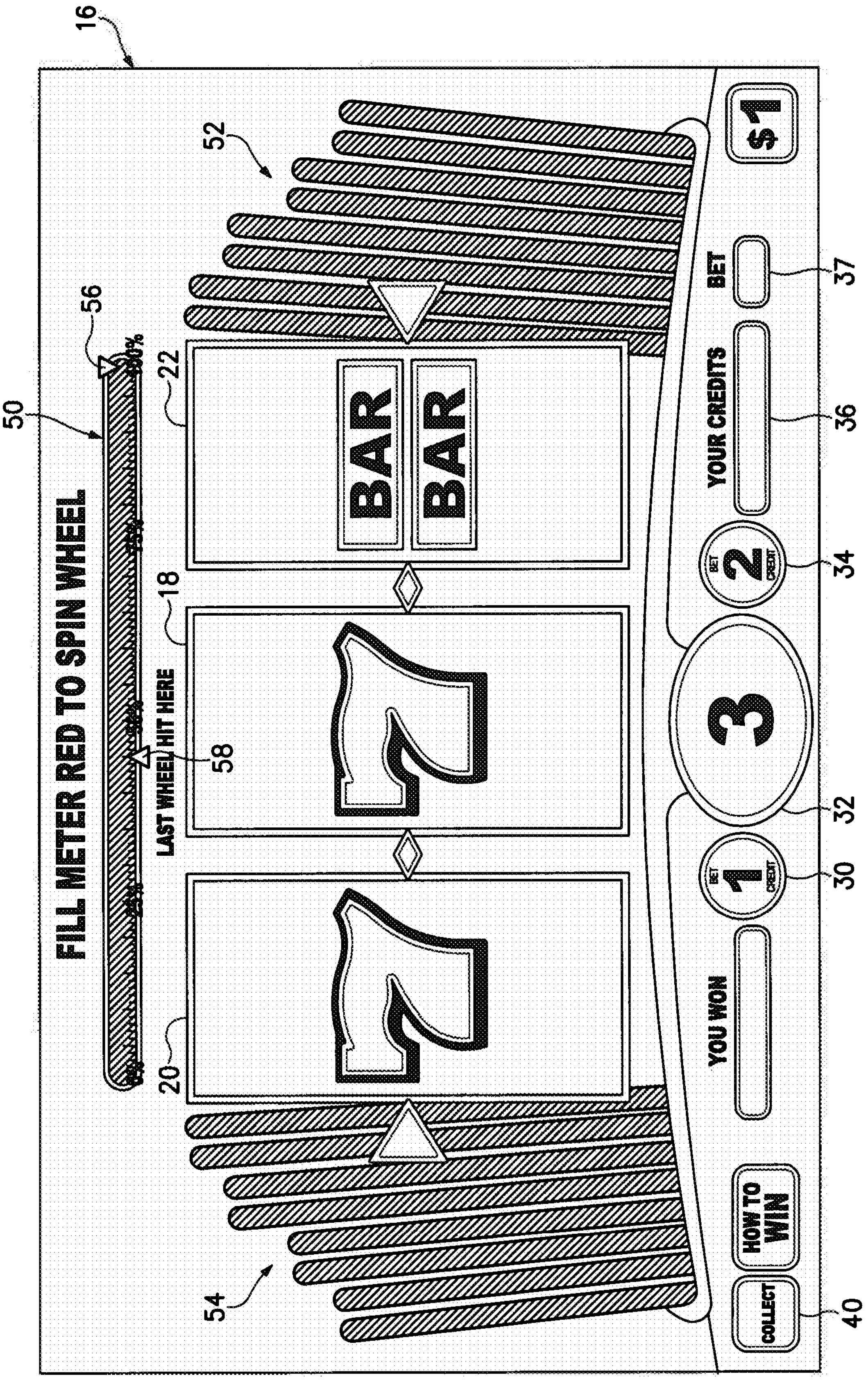

In FIG. 14, the meter has further progressed, and in this illustration, the machine has triggered play of the secondary game at the location of pointer 58 in FIG. 14. When this happens, pointer 58 and the corresponding dividing line between the red and blue images move rapidly all the way to the right, thus filling the meter with all red, as shown in FIG. 15. The player is then instructed, via display 16, to hit button 28 to play the secondary game. This initiates rotation of wheel 42, which spins and stops on a number indicating the amount of credit that then goes to the Your Credits display 36. The game is reset, as will be described, and progress begins toward the opportunity to play another secondary game.

In still another approach to displaying win proximity, the rightmost position of the meter is not tied to either the top value in the range from which the random trigger is selected or to the value of the random trigger. Rather, the rightmost meter value starts at the top value in the range from which the trigger is selected and changes toward the value of the random trigger as the count progresses. This results in meter movement proportional to more than one count at a time as the rightmost value of the meter decreases toward the random trigger value. Of course, the counter continues to count one count at time, and all of the counts between the lower end of the range and the random trigger must occur before the secondary game is triggered.

Figure 16:
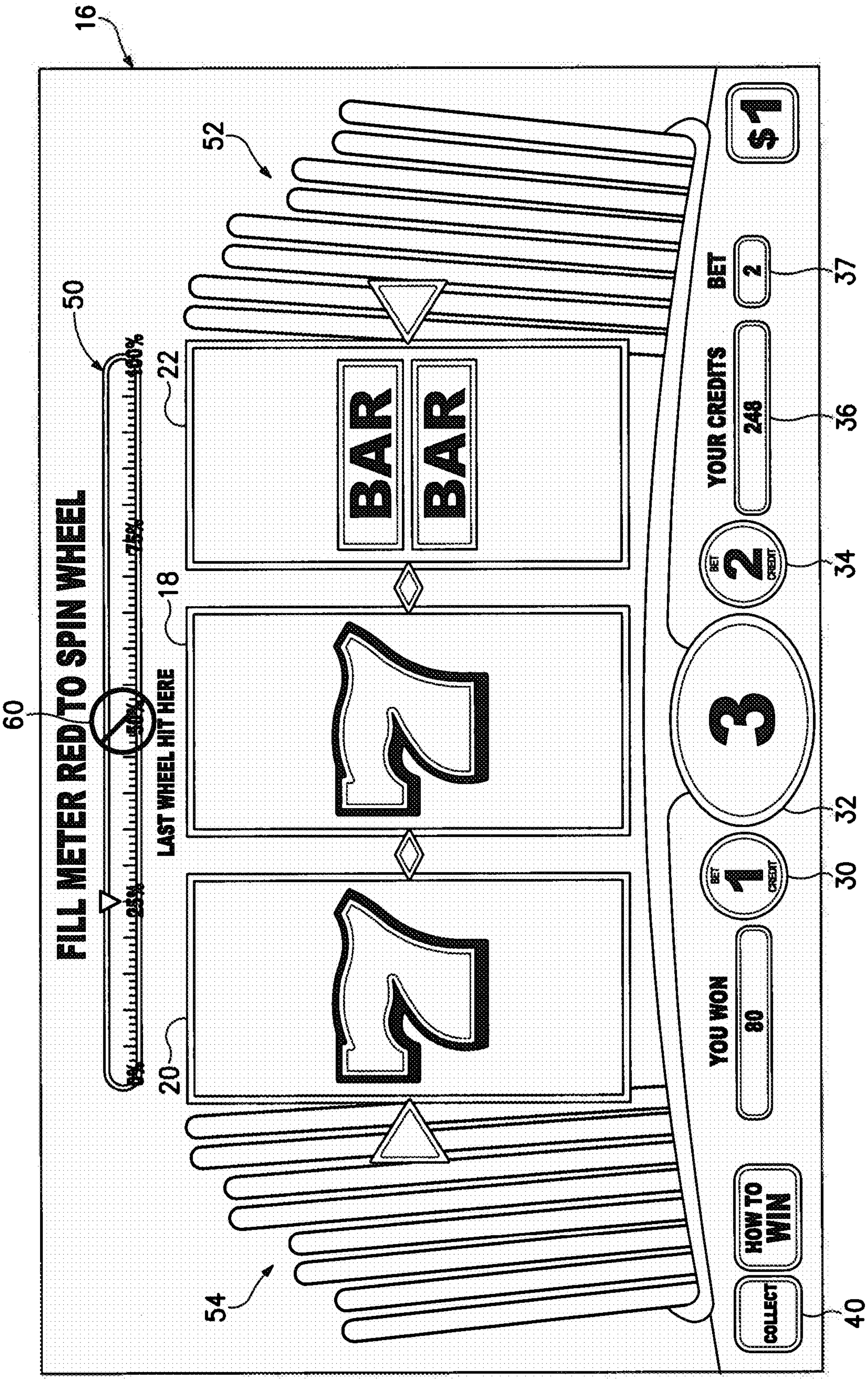

In a preferred embodiment, only a maximum credit bet (3 credits in the game depicted here), qualifies the player to play the secondary game. A bet of one or two credits will result in the player not being eligible to play the secondary game. In addition, all of the displays that indicate progress toward play of the secondary game are shown in gray, as can be seen in FIG. 16. And the rods, like rods 46, 48 (FIG. 11), also become a gray or neutral light. A symbol (a circle with a slash) 60 also appears over meter 50 to indicate that there is no eligibility nor will the progress toward the game be displayed. Alternatively, one or more of these win proximity indicators may be shown even when the wager is less than the maximum possible wager. In still another implementation, only wagers that are less than a predetermined value are counted, e.g., only wagers of one credit or of one or two credits.

The term "graphical" as used herein means a pictorial representation. This could include changes in images on a display, changes in light intensity, changes in color, or a combination of the foregoing, whether or not combined with numeric, alphabetical or alphanumeric displays.

In an alternative embodiment, audio indications could be used in lieu of or in addition to graphical indications of win proximity. Substantially the same controls used that are used to create graphical indications of win proximity could be used to create audio indications. In other words, signals generated by the controls are applied to an audio system that provides an audio indication of the change in likelihood of awarding a bonus award.

Sometimes casinos are plagued by undesirable players, some of whom operate in teams, looking to play games only when a mystery award appears to be near. Because prior art systems, as described above, show the current value of an award and because the high end of the award is known, players may begin playing minimum credits only when the award is near. This reduces revenue from the games and potentially awards these undesirable players at the expense of patrons who generate more revenue for the casino. These undesirable players are discouraged by requiring maximum credits to be eligible for the mystery award and by preventing display of the mystery proximity when less than maximum credits are played.

Figure 17:
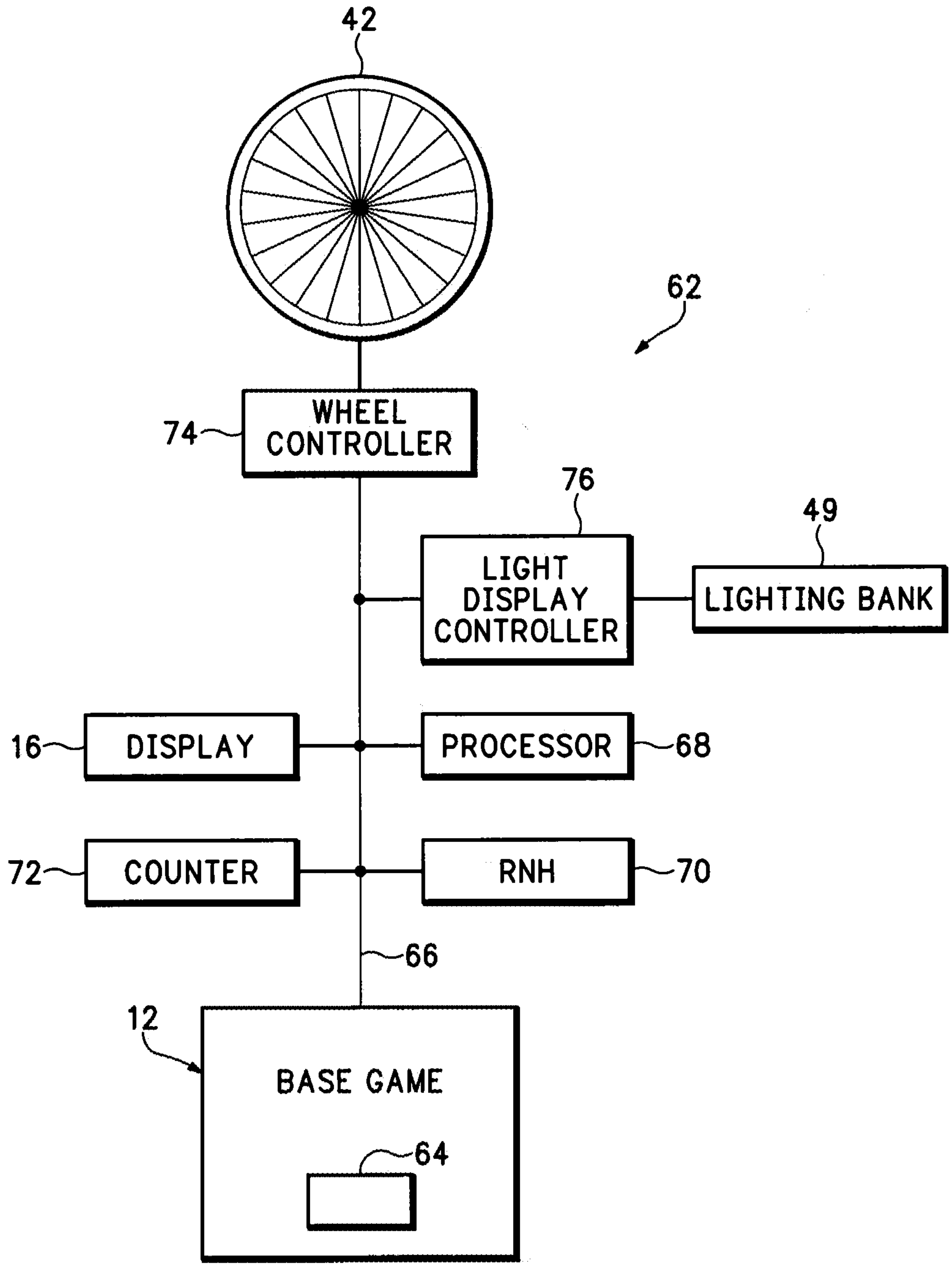
FIG. 17 is a highly schematic diagram of selected components of the game of FIG. 11.

With reference to FIG. 17, consideration will now be given to the implementation of gaming device 10. Indicated generally at 62 is a highly schematic diagram of some of the components of gaming device 10. Components that have been previously identified retain the same numeral in FIG. 17. Base game 12 includes a pay table 64 that controls the odds of producing various combinations of reel symbols 18, 20, 22 (in FIG. 11), some of which provide associated base-game awards. Control of video slot machines that implement such pay tables is well known. Although display 16 is built into the base game, inputs into the base game permit images related to the secondary game, as described above, to appear on the display along with the base-game reel symbols.

A bus 66 communicates with base game 12 and display 16. Also in communication with the bus are a processor 68, a random number generator (RNG) 70, a counter 72, a wheel controller 74, and a light display controller 76. Processor 68 is programmed, as will be soon described, to selectively activate wheel controller 74, which in turn causes wheel 42 to spin and stop at a preselected number.

In the present embodiment, processor 68 is part of the base game. In addition to controlling the base game, additional programming, as will be explained, is implemented to control the secondary game. For example, processor 68 is programmed to trigger RNG 70, which in the present embodiment is implemented in software, upon completion of a secondary game to select a new trigger threshold for the next secondary game. Counter 72, also implemented in software in this embodiment, counts each base game played with maximum (in this case 3) credits, and when the trigger threshold is reached, processor 68 triggers the start of the next secondary game. Additional counters could be implemented to count toward their associated trigger thresholds to provide additional awards via additional bonus award mechanisms. This could be an implementation in which each of the segments in wheel 42 has its own associated counter, trigger threshold and award as described above in connection with a different embodiment. The bonus award mechanism in the present embodiment of the invention comprises the software and associated hardware that delivers the bonus to a player.

The processor also indicates which light displays, both on display 16 and on lighting bank 49, are presented depending upon the state of game play.

In another approach, the odds of playing the secondary game may be improved by changing the odds for a random number generator (RNG) to trigger the secondary game after each play of the base game. For example, an RNG could be programmed to have a 1/200 chance to trigger the secondary game after the first play of the base game and thereafter reduce the odds after each successive game in the following sequence: 1/199, 1/198, 1/197 . . . 1/1 until the secondary game is triggered. In a variation on this aspect, the odds might only reduce after each game to a certain level and then hold at that level for additional base games.

In another variation, the odds of winning decrease with each successive play. For example, on the first play odds of 1/10 are provided for winning the secondary bonus. On the second play, odds of 1/11, etc. Odds of winning the secondary bonus could continually increase or decrease, increase or decrease until a limit was reached or increase for a period of time and then decrease and then increase again. In addition, odds could change after one or more wagers and not change after another one or more wagers. Any such sequence of successively changing odds is useful with my invention. One of ordinary skill in the art could readily implement this variation.

Figure 18:
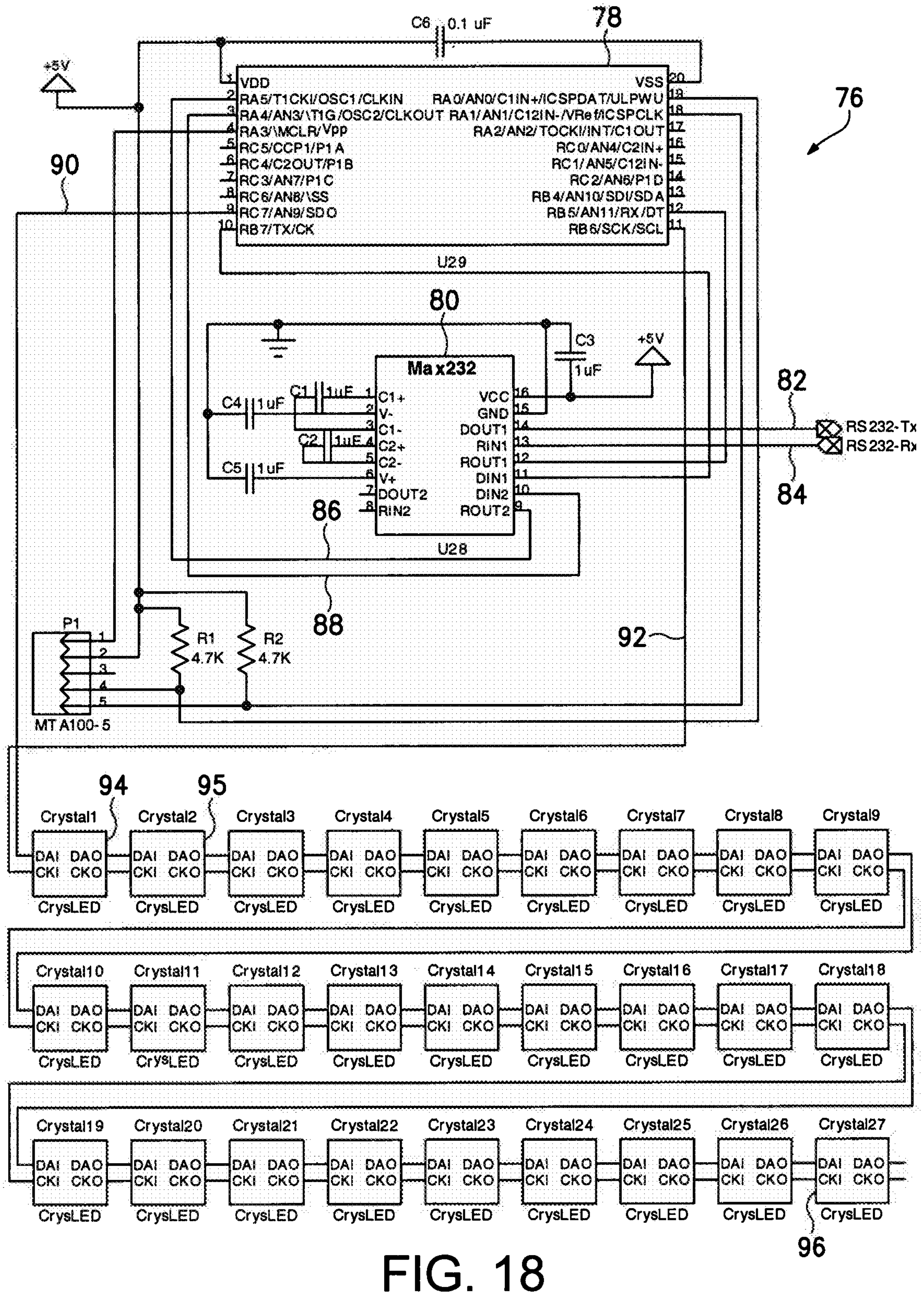
FIGS. 18-19 are schematic diagrams of a portion of the circuitry for controlling lights and displays on the game of FIG. 11.

FIG. 18 comprises a schematic diagram of light display controller 76 in FIG. 17. Light display controller 76 includes a Programmable Intelligent Computer (PIC) microprocessor 78 and an RS232 interface 80. Interface 80 communicates with processor 68 via a transmit line 82 and a receive line 84. Interface 80 in turn communicates with PIC microprocessor 78 via lines 86, 88.

The PIC microprocessor includes a serial data out (SDO) line 90 and a clock (CLK) line 92 that are connected to a light module 94, which is the first in a chain of light modules, including the next light module 59 and the last light module 96. There are a total of 27 light modules, one for each of the rods, like rods 42, 42, in light bank 49. As will soon be seen, each light module controls the light in a particular one of the rods to create a variety of lighting effects.

Figure 19:
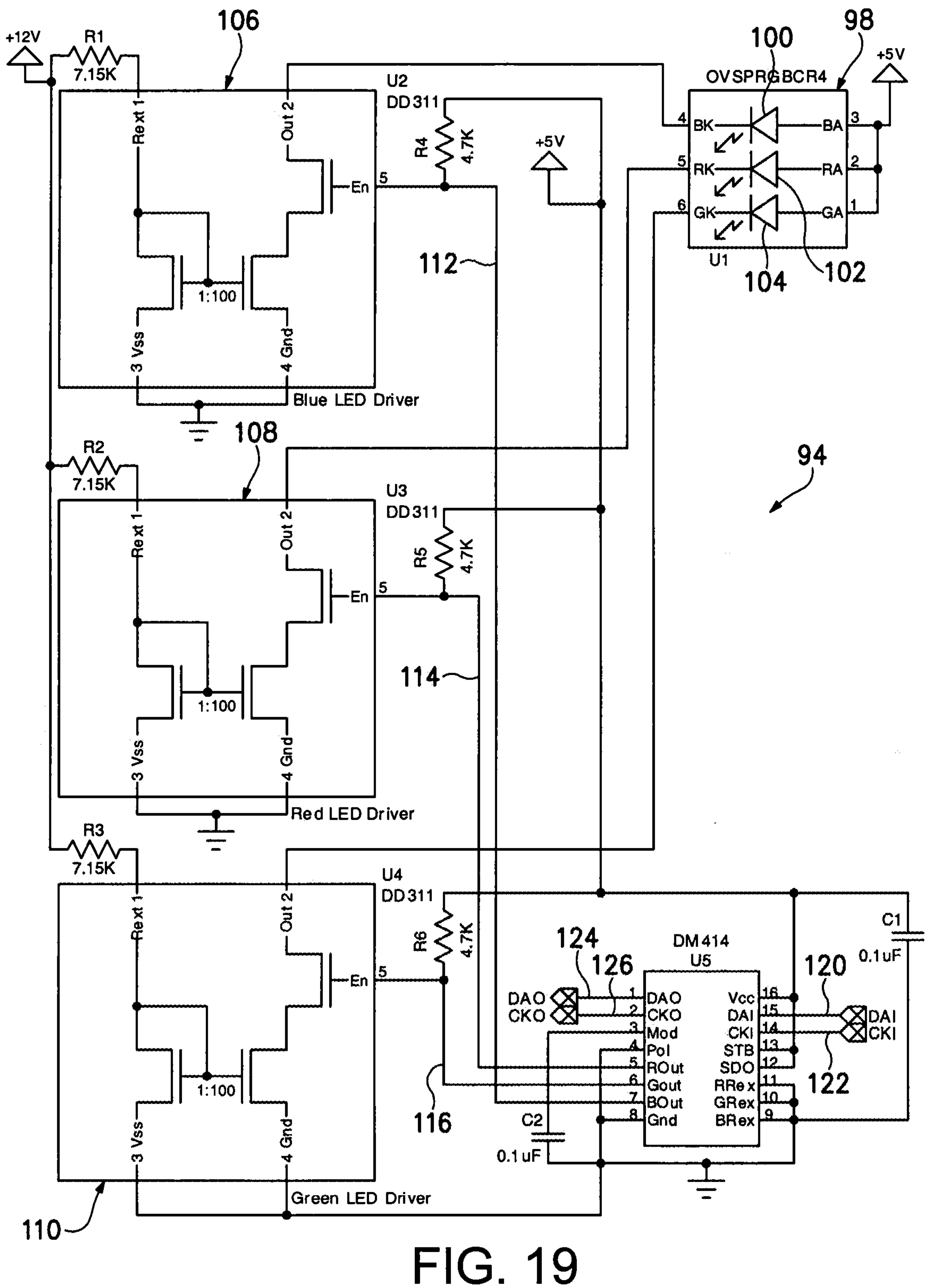

For a more detailed schematic of each of the light modules, attention is directed to FIG. 19, which depicts light module 94. Light module 94 is substantially identical to each of the other light modules. Included therein is a tri-color LED chip 98. Chip 98 includes a blue LED 100, a red LED 102, and a green LED 104. Each LED has its anode tied to +5 volts, and each cathode is driven with a separate dedicated LED driver 106, 108, 110, respectively. Each driver includes an enable line 112, 114, 116, respectively. The enable lines are driven by a chip 118 in response to data provided to the chip via data-in (DAI) terminal 120 and clock (CLK) terminal 122. The data in chip 118 may be shifted out to the next light module 95 in FIG. 18 via data-out (DAO) terminal 122 and clock (CLK) terminal 126.

The data that is transferred into each light module, like light module 94, via DAI and CLK terminals, like DAI terminal 120 and CLK terminal 122 comprises 24 bits of data, 8 bits associated with each color. Each 8 bits modulates a pulse with signal on their associated enable line, like the blue enable line 112. As a result, each color can be selected with an intensity of between 0 and 255, with 0 being off and 255 being the most intense illumination possible.

Each of tri-color LED chips is positioned at the base of a corresponding one of the rods, like rods 46, 48, in light bank 49. In the present embodiment, the rods are made from Plexiglas polymer, which conducts light into a light channel surrounded with a frosted edge. The result is a rod that glows with selected colors and intensities.

In operation, a number of pre-programmed lighting modes are stored in a memory associated with PIC microprocessor 78. These include:

- PURE_SWEEP—sets all 27 rods to the same color.
- GRAY—fills all rods with gray that starts at the center rod and sweeps toward the outer rods on each side in a little over a second.
- REDFILL—fills all rods with blue starting at the outer rods and sweeping toward the center in a little over a second.
- RANBOW_ANIM—starts with the rods set to different colors and rotates the colors from left to right.
- BLUETORED—processor 68 provides a single byte with a value of 0-255 to PIC microprocessor 78, which determines the percentage of rods starting from the outside and moving toward the center) that are red. The rest of the rods are blue except for the one between the transition from red to blue, which is a combination of blue and red.

The value of the byte provided in the BLUETORED mode is related to the likelihood of initiating the secondary game. As described above, this could be an indication of how close the count is to the random trigger value, to the upper end of the range from which the random trigger value is chosen, or to a combination of the two. In addition to driving the rods, signals from light display controller 76 also control the display of meter 50 and the display of rod images 52. As a result, coordinated graphical representations of win proximity are provided in a variety of ways.

Figure 20:
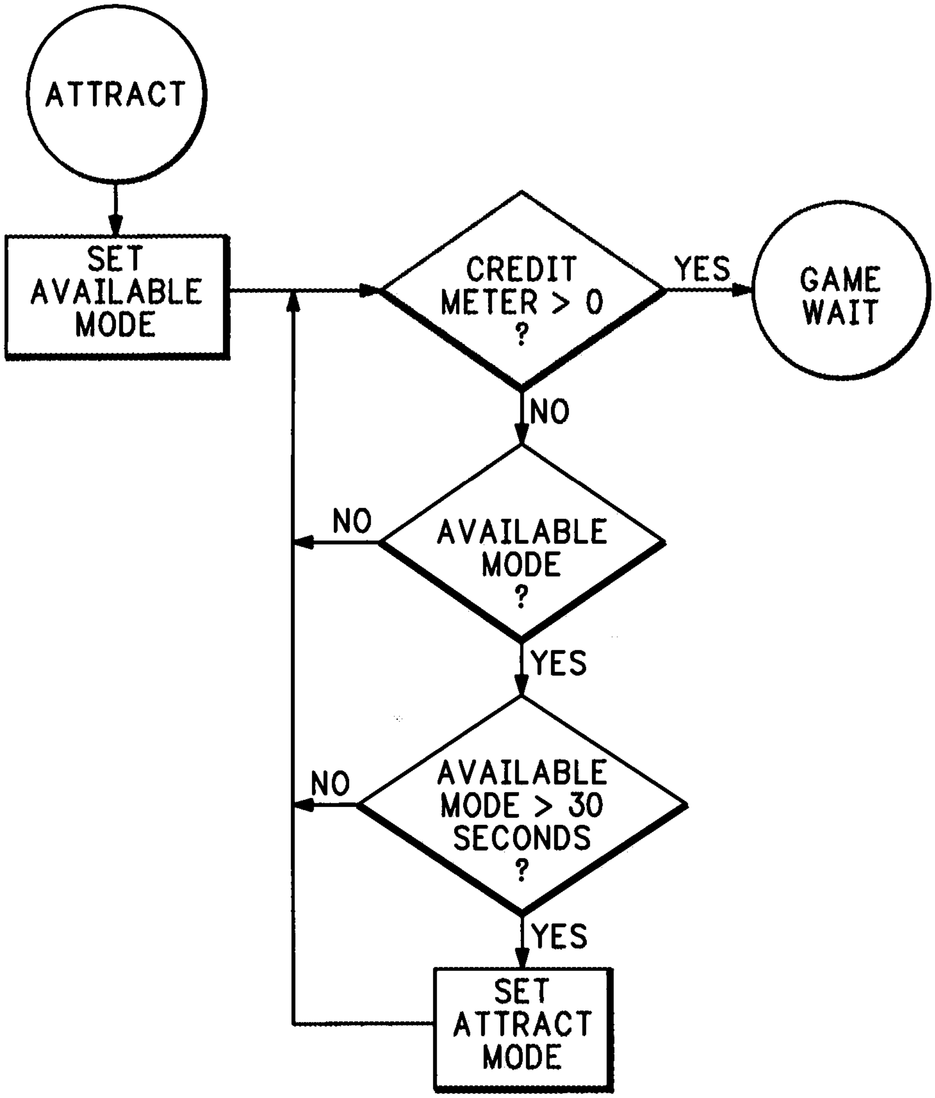
FIGS. 20-22 are flow charts that depict the behavior of lights on the game of FIG. 11 during different modes of operation.
Figure 21:
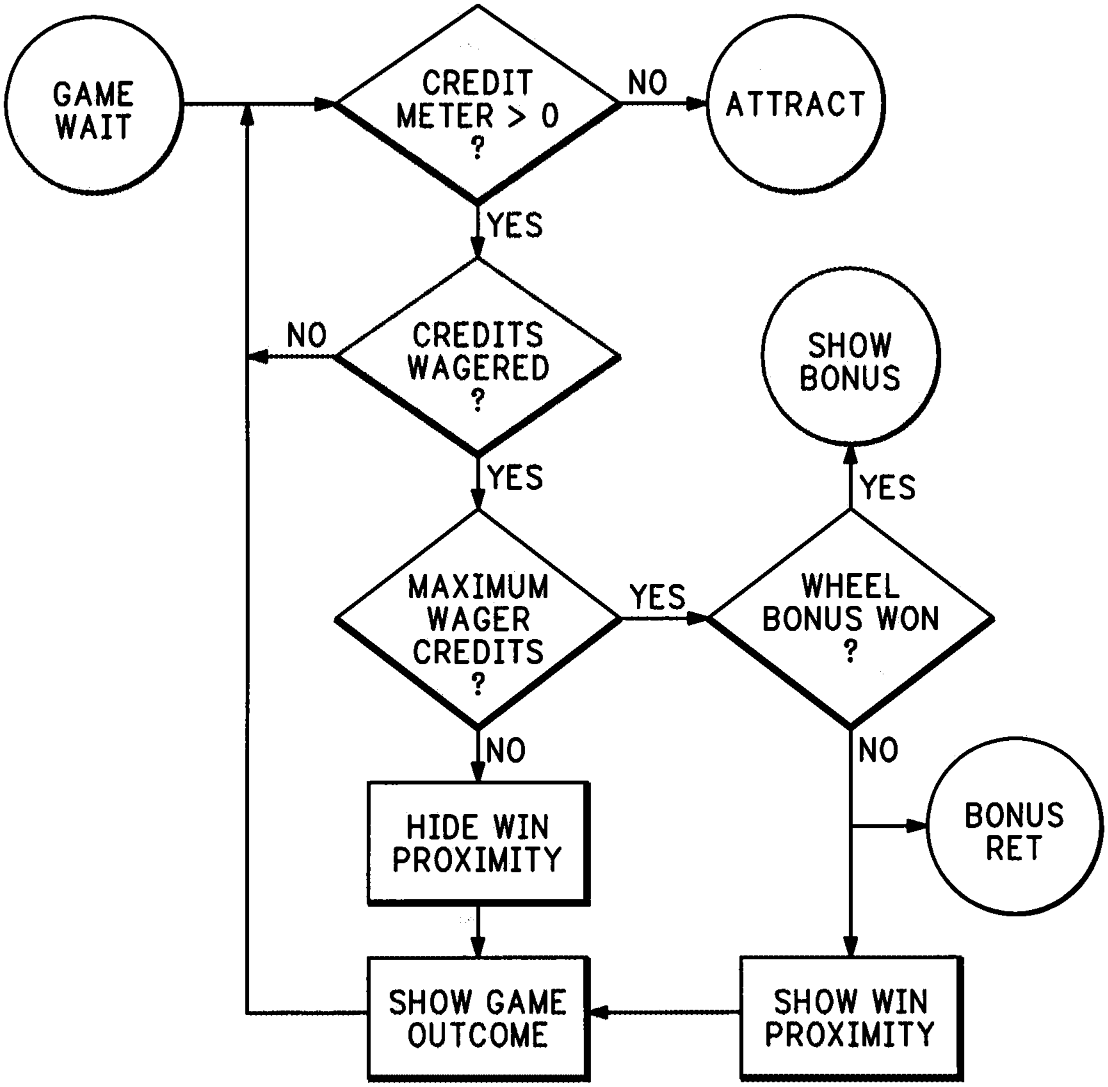
Figure 22:
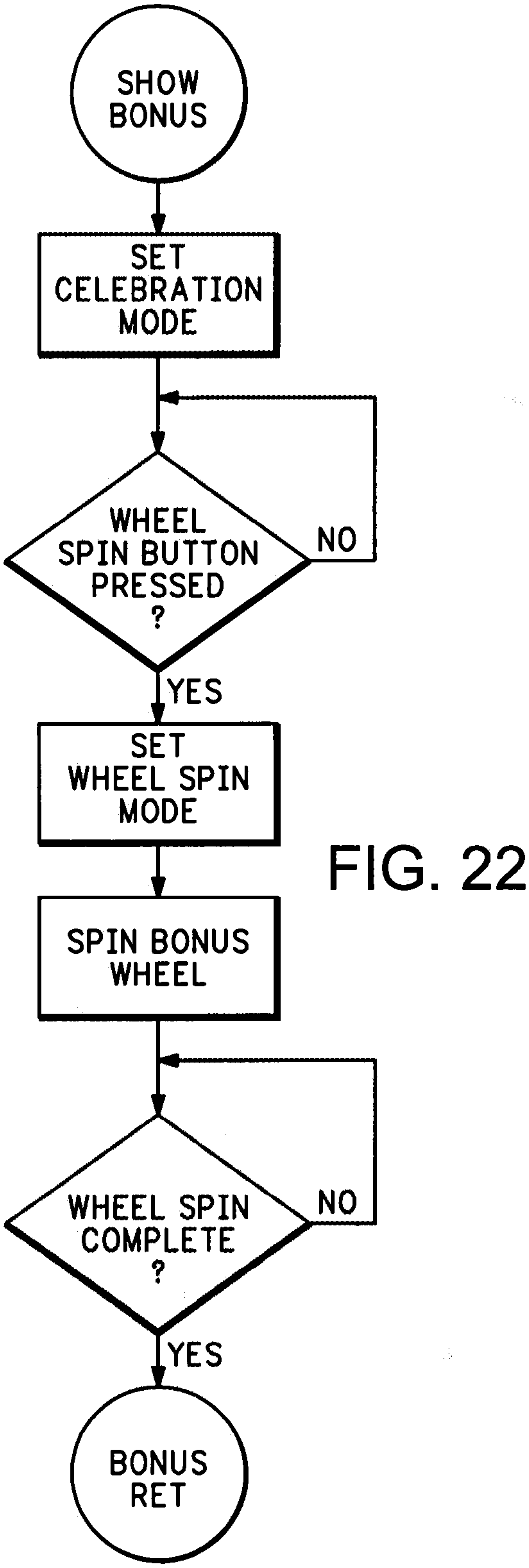

Turning now to FIGS. 20-22, consideration will be given to examples of various lighting modes during game play. In FIG. 20, when the credit meter first goes to zero, either as a result of the player cashing out or wagering his or her last credit, the lighting mode is set to Available mode for 30 seconds. In this example, available mode comprises RANBOW_ANIM, described above.

In the event that no further credits are wagered during Available mode, the lighting mode is set to Attract mode (PURE_SWEEP) until additional credits are wagered.

FIG. 21 describes lighting behavior during normal game play, i.e., when there are credits on the credit meter. For every wager less than 3 credits, the lighting mode is set to GRAY and meter 50 and rod images 52 are set as shown in FIG. 16. When 3 credits, maximum in this example, are wagered, the lighting mode is set to BLUETORED, and win proximity is displayed, e.g., as shown in FIGS. 12-15. As previously mentioned, the game could be implemented to always show win proximity, even in the presence of a 2 or 3 credit bet, i.e., less than the maximum.

After each maximum bet, the process depicted in FIG. 21 checks to see if the count equals the random trigger. If so, the player is given the opportunity to play the secondary game, and the process depicted in FIG. 22 is implemented.

In celebration mode, the game is programmed with celebratory audio and lighting effects. It waits for the player to press the maximum credit button, which initiates the wheel spin in this mode. Alternatively, the game could be programmed to wait a predetermined length of time for the player to press the button and then automatically enter wheel spin mode if the button has not been pressed by when the predetermined time lapsed.

Either way, wheel spin mode is entered when processor 68 instructs wheel controller 74 to spin the wheel. When the wheel spin is complete, the credits won by the player, which are indicated on the wheel segment aligned with pointer 44, are applied to the credit meter, and the process of FIG. 22 transfers control back to the process of FIG. 21. Once all the credits are off the credit meter, the process of FIG. 21 transfers control to the process of FIG. 20.

I have described above specific implementations of my invention only as examples of how implementation may be accomplished. It will be clear to one of skill in the art that my invention may be embodied in the manner described or in a range of other expressions.

What is claimed is:

1. A method comprising:

based on receiving one or more wagers, executing a game on an electronic gaming machine, wherein the game is associated with a trigger threshold;

based on executing the game on the electronic gaming machine, generating a count;

determining one or more winning outcomes, wherein the one or more winning outcomes are associated with one or more credit amounts;

incrementing, based on the one or more winning outcomes, the count as a function of the one or more credit amounts; and awarding a bonus award when the count bears a predefined relationship to the trigger threshold.

2. The method of claim 1, wherein the one or more wagers are received via one or more of: a low power communications module, an internet connected module, a cash acceptor, coin acceptor, token acceptor, credit transfer, or electronic funds transfer.

3. The method of claim 1, wherein the electronic gaming machine comprises one or more of: a virtual slot machine, a virtual card machine, or a virtual table game.

4. The method of claim 1, wherein the bonus award comprises one or more opportunities to play a secondary game.

5. The method of claim 1, wherein incrementing the count as a function of the one or more credit amounts comprises incrementing the count in proportion to the one or more credit amounts.

6. The method of claim 1, further comprising delaying, based on a user selection, awarding the bonus award.

7. The method of claim 1, further comprising:

receiving a player identifier; and transferring, based on the player identifier, the one or more credit amounts to an account associated with the player identifier.

8. One or more non-transitory computer-readable media storing processor executable instructions thereon, which, when executed by at least one processor cause the at least one processor to:

based on receiving one or more wagers, execute a game on an electronic gaming machine, wherein the game is associated with a trigger threshold;

based on executing the game on the electronic gaming machine, generate a count;

determine one or more winning outcomes, wherein the one or more winning outcomes are associated with one or more credit amounts;

increment, based on the one or more winning outcomes, the count as a function of one or more credit amounts; and award a bonus award when the count bears a predefined relationship to the trigger threshold.

9. The one or more non-transitory computer-readable media of claim 8, wherein the one or more wagers are received via one or more of: a low power communications module, an internet connected module, a cash acceptor, coin acceptor, token acceptor, credit transfer, or electronic funds transfer.

10. The one or more non-transitory computer-readable media of claim 8, wherein the electronic gaming machine comprises one or more of: a virtual slot machine, a virtual card machine, or a virtual table game.

11. The one or more non-transitory computer-readable media of claim 8, wherein the bonus award comprises one or more opportunities to play a secondary game.

12. The one or more non-transitory computer-readable media of claim 8, wherein the processor executable instructions that, when executed by the at least one processor, cause the at least one processor to increment the count as a function of the one or more credit amounts further cause the at least one processor to increment the count in proportion to the one or more credit amounts.

13. The one or more non-transitory computer-readable media of claim 8, wherein the processor executable instructions, when executed by the at least one processor, further cause the at least one processor to delay, based on a user selection, awarding the bonus award.

14. The one or more non-transitory computer-readable media of claim 8, wherein the processor executable instructions, when executed by the at least one processor, further cause the at least one processor to:

receive a player identifier; and transfer, based on the player identifier, the one or more credit amounts to an account associated with the player identifier.

15. An apparatus comprising:

one or more processors; and memory storing processor executable instructions that, when executed by the one or more processors, cause the apparatus to:

based on receiving one or more wagers, execute a game on apparatus, wherein the game is associated with a trigger threshold;

based on executing the game on the apparatus, generate a count;

determine one or more winning outcomes, wherein the one or more winning outcomes are associated with one or more credit amounts;

increment, based on the one or more winning outcomes, the count as a function of one or more credit amounts; and award a bonus award when the count bears a predefined relationship to the trigger threshold.

16. The apparatus of claim 15, wherein the one or more wagers are received via one or more of: a low power communications module, an internet connected module, a cash acceptor, coin acceptor, token acceptor, credit transfer, or electronic funds transfer.

17. The apparatus of claim 15, wherein apparatus comprises one or more of: a virtual slot machine, a virtual card machine, or a virtual table game.

18. The apparatus of claim 15, wherein the bonus award comprises one or more opportunities to play a secondary game.

19. The apparatus of claim 15, wherein the processor executable instructions, when executed by the one or more processors, further cause the one or more processors to delay, based on a user selection, awarding the bonus award.

20. The apparatus of claim 15, wherein the processor executable instructions, when executed by the one or more processors, further cause the one or more processors to:

receive a player identifier; and transfer, based on the player identifier, the one or more credit amounts to an account associated with the player identifier.

* * * * *